(12) United States Patent
Dave et al.

(10) Patent No.: US 10,746,985 B2
(45) Date of Patent: Aug. 18, 2020

(54) USE OF MICROPARTICLE ADDITIVES TO SIMULTANEOUSLY ENABLE ARTIFACT-FREE IMAGE REGISTRATION, AUTO-FOCUSING, AND CHROMATIC ABERRATION CORRECTION IN MICROSCOPY

(71) Applicant: Massachusetts Institute of Technology, Cambridge, MA (US)

(72) Inventors: Shivang R. Dave, Boston, MA (US); Germán González Serráno, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 146 days.

(21) Appl. No.: 15/924,122

(22) Filed: Mar. 16, 2018

(65) Prior Publication Data
US 2018/0210197 A1 Jul. 26, 2018

Related U.S. Application Data

(63) Continuation of application No. 14/680,573, filed on Apr. 7, 2015, now abandoned.
(Continued)

(51) Int. Cl.
*G02B 27/00* (2006.01)
*G06T 7/38* (2017.01)
(Continued)

(52) U.S. Cl.
CPC ..... *G02B 27/0025* (2013.01); *G06K 9/00134* (2013.01); *G06T 7/38* (2017.01);
(Continued)

(58) Field of Classification Search
CPC .......................... G06T 2207/10056; G06T 2207/30024; G01N 21/6458
See application file for complete search history.

(56) References Cited

U.S. PATENT DOCUMENTS

| | | |
|---|---|---|
| 4,513,438 A | 4/1985 | Graham et al. |
| 5,473,706 A | 12/1995 | Bacus et al. |

(Continued)

FOREIGN PATENT DOCUMENTS

| | | |
|---|---|---|
| CA | 2229175 A1 | 8/1999 |
| EP | 2485050 A1 | 8/2012 |

(Continued)

OTHER PUBLICATIONS

Gupta, P.B. et al., "Identification of Selective Inhibitors of Cancer Stem Cells by High-Throughput Screening", Cell, 138:645-659 (2009).

(Continued)

*Primary Examiner* — Utpal D Shah
(74) *Attorney, Agent, or Firm* — Hamilton, Brook, Smith & Reynolds, P.C.

(57) ABSTRACT

High-contrast, high-density cell-sized microparticles are introduced into a cell-containing solution prior to the solution being spread onto a planar substrate for imaging. The microparticles facilitate both the process of imager autofocusing and the subsequent registration of multiple images taken of regions of the substrate. The microparticles can further facilitate the correction of chromatic aberration.

10 Claims, 17 Drawing Sheets
(3 of 17 Drawing Sheet(s) Filed in Color)

Related U.S. Application Data

(60) Provisional application No. 61/976,114, filed on Apr. 7, 2014.

(51) Int. Cl.
*G06T 7/90* (2017.01)
*G06K 9/00* (2006.01)
*G02B 21/34* (2006.01)
*G02B 21/24* (2006.01)
*G01N 21/64* (2006.01)
*G02B 21/36* (2006.01)

(52) U.S. Cl.
CPC .......... *G06T 7/90* (2017.01); *G01N 21/6458* (2013.01); *G02B 21/244* (2013.01); *G02B 21/34* (2013.01); *G02B 21/365* (2013.01); *G06T 2207/20104* (2013.01); *G06T 2207/30024* (2013.01)

(56) References Cited

U.S. PATENT DOCUMENTS

| | | |
|---|---|---|
| 5,671,288 A | 9/1997 | Wilhelm et al. |
| 5,786,219 A * | 7/1998 | Zhang ................ G01N 15/1012 422/82.07 |
| 6,674,058 B1 | 1/2004 | Miller |
| 6,816,606 B2 | 11/2004 | Wetzel et al. |
| 7,079,673 B2 * | 7/2006 | Foran ....................... G06K 9/00 382/128 |
| 7,369,304 B2 | 5/2008 | Maenle et al. |
| 7,776,613 B2 | 8/2010 | Zhuang et al. |
| 7,783,098 B2 | 8/2010 | Douglass et al. |
| 7,876,948 B2 | 1/2011 | Wetzel et al. |
| 7,893,988 B2 | 2/2011 | Tafas et al. |
| 9,576,772 B1 * | 2/2017 | Arjavac ................. H01J 37/28 |
| 10,282,647 B2 | 5/2019 | Dave et al. |
| 2003/0148393 A1 | 8/2003 | Woodbury et al. |
| 2003/0218730 A1 * | 11/2003 | Murakami ............ G03F 7/7005 355/53 |
| 2004/0150217 A1 | 8/2004 | Heffelfinger et al. |
| 2004/0184646 A1 | 9/2004 | Oosawa |
| 2005/0254045 A1 * | 11/2005 | Weiss ..................... G01N 21/95 356/237.5 |
| 2007/0273943 A1 | 11/2007 | Hendriks et al. |
| 2010/0040266 A1 | 2/2010 | Perz et al. |
| 2010/0178712 A1 * | 7/2010 | Zhang ................... B01L 3/5085 436/523 |
| 2010/0214430 A1 * | 8/2010 | De Boer ............ G01N 21/6458 348/222.1 |
| 2010/0262374 A1 * | 10/2010 | Hwang ................... B82Y 30/00 702/19 |
| 2011/0040169 A1 * | 2/2011 | Kamen .................. A61B 6/037 600/411 |
| 2012/0025075 A1 * | 2/2012 | Moore ................. G02B 21/002 250/307 |
| 2012/0127297 A1 | 5/2012 | Baxi et al. |
| 2012/0257811 A1 * | 10/2012 | Metzger ................ G06T 7/0012 382/133 |
| 2014/0049634 A1 | 2/2014 | Tafas et al. |
| 2014/0050386 A1 | 2/2014 | Humayun et al. |
| 2014/0186859 A1 * | 7/2014 | Calderwood .......... G02B 21/26 435/7.32 |
| 2015/0006105 A1 | 1/2015 | Zhou et al. |
| 2015/0065371 A1 * | 3/2015 | Seppo ................ G01N 21/6428 506/9 |
| 2015/0141278 A1 * | 5/2015 | Hollman-Hewgley ...................... G01N 1/30 506/9 |
| 2015/0243471 A1 * | 8/2015 | Hooghan ................ H01J 37/20 216/39 |
| 2015/0286887 A1 | 10/2015 | Dave et al. |
| 2016/0160169 A1 * | 6/2016 | Paczkowski ...... B01L 3/502761 506/10 |
| 2016/0252719 A1 * | 9/2016 | Liu ..................... G01N 33/4833 348/49 |
| 2016/0328635 A1 | 11/2016 | Dave et al. |
| 2017/0220733 A1 * | 8/2017 | Zhuang .................. C07H 21/02 |

FOREIGN PATENT DOCUMENTS

| | | |
|---|---|---|
| WO | 91/06911 A1 | 5/1991 |
| WO | 2010/067256 A1 | 6/2010 |
| WO | WO2012054783 | 4/2012 |
| WO | WO2012168184 | 12/2012 |
| WO | 2013/034430 A1 | 3/2013 |
| WO | WO2013170048 A1 | 11/2013 |
| WO | WO 2015/157246 A2 | 10/2015 |
| WO | 2016/179286 A1 | 11/2016 |

OTHER PUBLICATIONS

Invitation to Pay Additional Fees and, Where Applicable, Protest Fee and Partial International Search Report, PCT/US2015/024664, "Use of Microparticle Additives to Simultaneously Enable Artifact-Free Image Registration, Auto-Focusing, and Chromatic Aberration Correction in Microscopy," dated (6 pages) Jul. 14, 2015.
International Preliminary Report on Patentability, "Substrate Pre-Scanning for High Throughput Microscopy," PCT/US2016/030786, dated Nov. 17, 2017.
Invitation to Pay Additional Fees and, Where Applicable, Protest Fee, PCT/US2016/030786, "Substrate Pre-Scanning for High Throughput Microscopy," dated Aug. 5, 2016.
Notification Concerning Transmittal of International Preliminary Report on Patentability, "Use of Microparticle Additives to Simultaneously Enable Artifact-Free Image Registration, Auto-Focusing, and Chromatic Aberration Correction in Microscopy," PCT/US2015/024664, (10 pages) dated Oct. 20, 2016.
Notification of Transmittal of the International Search Report and the Written Opinion of the International Searching Authority, or the Declaration, "Use of Microparticle Additives to Simultaneously Enable Artifact-Free Image Registration, Auto-Focusing, and Chromatic Aberration Correction in Microscopy," PCT/US2015/024664, (18 pages) dated Oct. 12, 2015.
Notification of Transmittal of the International Search Report and the Written Opinion of the International Searching Authority, or the Declaration, "Substrate Pre-Scanning for High Throughput Microscopy," PCT/US2016/030786, dated Sep. 30, 2016.
Komyei, Z. et al., "Cell Sorting in a Petri Dish Controlled by Computer Vision", Scientific Reports, 3(1088):1-10 (2013).
Kozubek, M. et al., "An Efficient Algorithm for Measurement and Correction of Chromatic Aberrations in Fluorescence Microscopy." Journal of Microscopy, 200: 206-217 (2000).
Makise, Soshiro et al., "Serial Algorithm for High-speed Autofocusing of Cells using Depth From Diffraction (DFDi) Method", 2008 IEEE Int'l Conf. Robotics & Automation, Pasadena, CA, pp. 3124-3129 (May 19-23, 2008).
McLeod, E. et al., "Toward Giga-Pixel Nanoscopy on a Chip: A Computational Wide-Field Look at the Nano-Scale Without the Use of Lenses", Lab Chip, The Royal Society of Chemistry 13:2028-2035 (2013).
Mundanyali, O. et al., "Wide-Field Optical Detection of Nanoparticles Using On-Chip Microscopy and Self-Assembled Nanolenses", Nature Photonics, 7:247-254 (2013). Royal Society of Chemistry 13:2028-2035 (2013).
Sheppard, et al., "The Extended-focus, Auto-focus and Surface-profiling Techniques of Confocal Microscopy", Journal of Modern Optics, 1988, vol. 35, No. 1, pp. 145-154.
Wetzel, A.W., et al., "Design of a High-Speed Slide Imaging System for Pathology," IEEE, pp. 305-308 (2002).
Yamamura, S. et al., "Single-Cell Microarray for Analyzing Cellular Response", Anal. Chem., 77(24):8050-8056 (2005).
Yoshimoto, N. et al., "An Automated System for High-Throughput Single Cell-Based Breeding", Scientific Reports, 3 (1191):1-9 (2013).
Zhao, Y. et al., "Optofluidic Imaging: Now and Beyond", Lab Chip, The Royal Society of Chemistry, 13:17-24 (2013).

(56) References Cited

OTHER PUBLICATIONS

Zhu, H. et al., "Optical Imaging Techniques for Point-of-Care Diagnostics", Lab Chip, The Royal Society of Chemistry 13:51-67 (2013).

Brandt, S., et al., "Multiphase Method for Automatic Alignment of Transmission Electron Microscope Images Using Markers", *J. Structural Biol.*, 133:10-22 (2001).

Erdelyi, Miklos, et al., "Single Molecule Pointillism Challenges in Localization Based Super-Resolution Microscopy", *Imaging & Microscopy*, 5 pages (2012).

Fronczek, D.N., et al., "High accuracy FIONA-AFM hybrid imaging", *Ultramicroscopy*, 111(5):340-355 (2011).

Jones, S.A., et al., "Fast, Three-dimensional super-resolution imaging of live cells", *Nature Methods*, 8(6):499-505 (2011).

Ress, D., et al., "Automatic acquisition of fiducial markers and alignment of images in tilt series for electron tomography", *J. of Electron Microscopy*, 48(3):277-287 (1999).

Sabass, B., et al., "High Resolution Traction Force Microscopy Based on Experimental and Computational Advances", *Biophysical Journal*, 94:207-220 (2008).

Shapiro, H.M. Cellular Astronomy—Foreseeable Future in Cytometry, *60A Cytometry Part A*, 115-124 (2004).

Vollath, D., et al., "The influence of the scene parameters and of noise on the behavior of automatic focusing algorithms", *J. Microsc.* 151:133-146 (1988).

Wang, Z., et al., "Optical virtual imaging at 50nm lateral resolution with a white-light nanoscope", *Nature Communications*, 2:218, 6 pages (2011).

Invitation to Pay Additional Fees and, Where Applicable, Protest Fee and Partial International Search Report, PCT/US2015/024664, "Use of Microparticle Additives to Simultaneously Enable Artifact-Free Image Registration, Auto-Focusing, and Chromatic Aberration Correction in Microscopy," dated Jul. 14, 2015.

Notification Concerning Transmittal of International Preliminary Report on Patentability, "Use of Microparticle Additives to Simultaneously Enable Artifact-Free Image Registration, Auto-Focusing, and Chromatic Aberration Correction in Microscopy," PCT/US2015/024664, dated Oct. 20, 2016.

Notification of Transmittal of the International Search Report and the Written Opinion of the International Searching Authority, or the Declaration, "Use of Microparticle Additives to Simultaneously Enable Artifact-Free Image Registration, Auto-Focusing, and Chromatic Aberration Correction in Microscopy," PCT/US2015/024664, dated Oct. 12, 2015.

\* cited by examiner

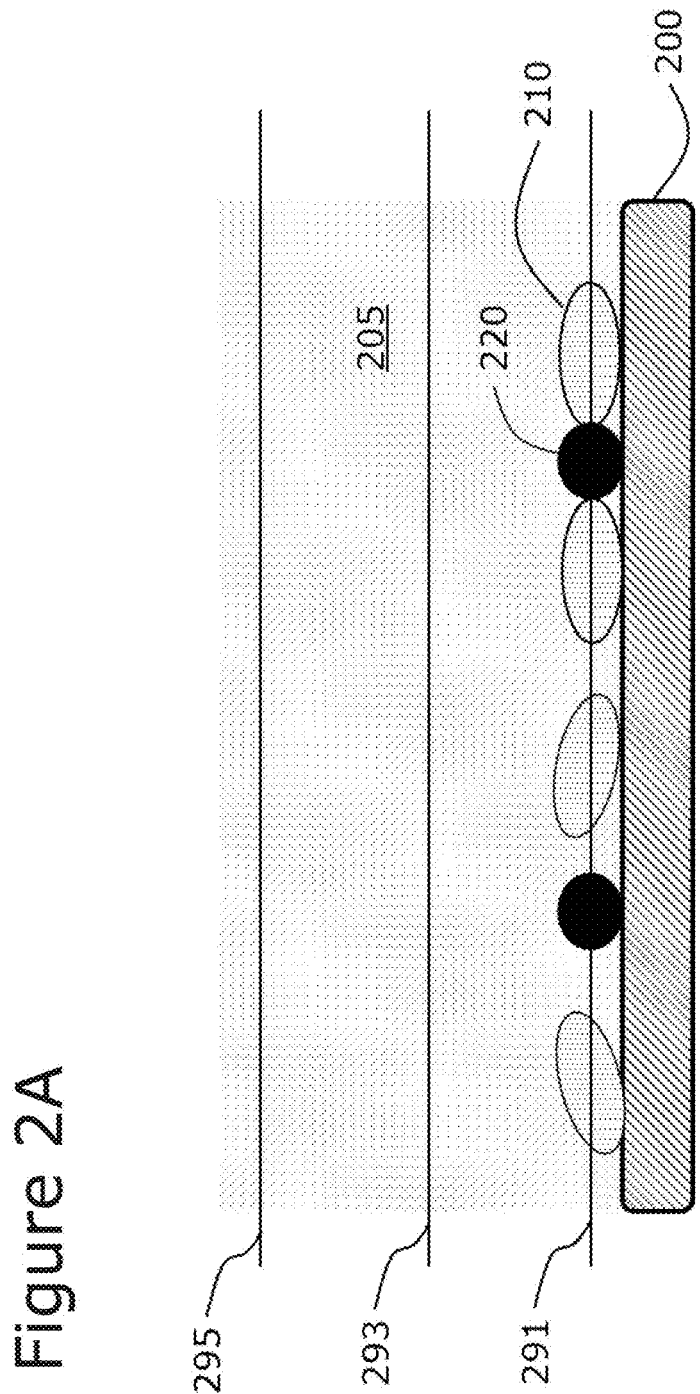

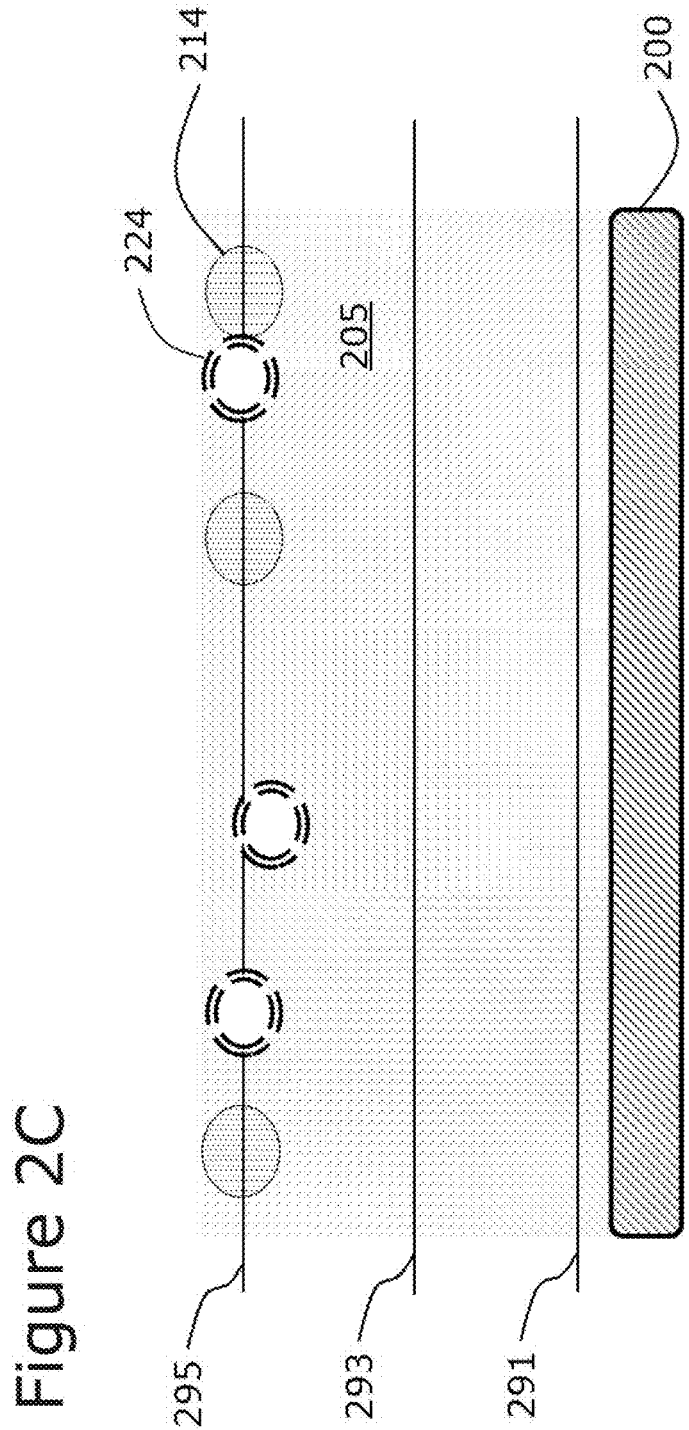

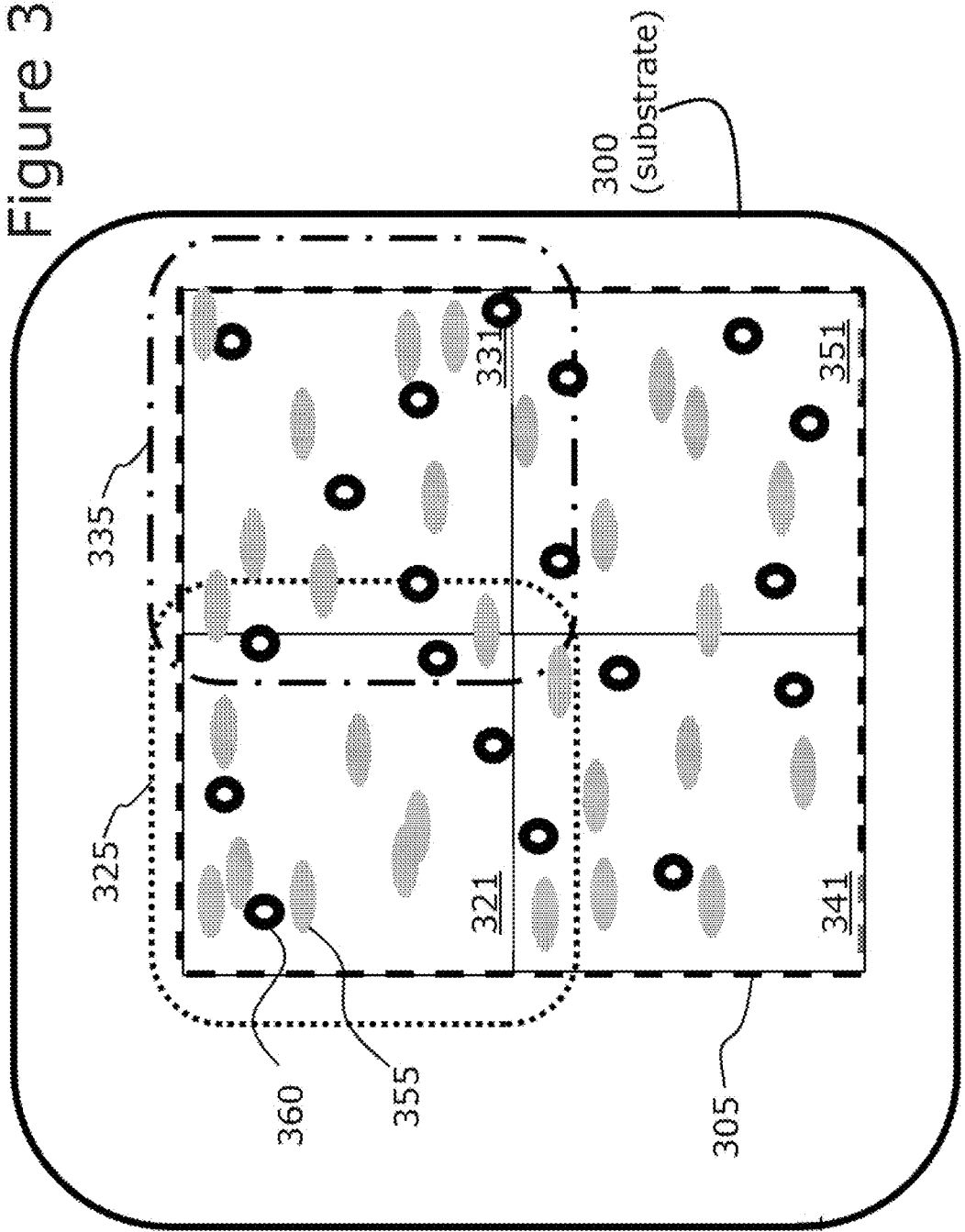

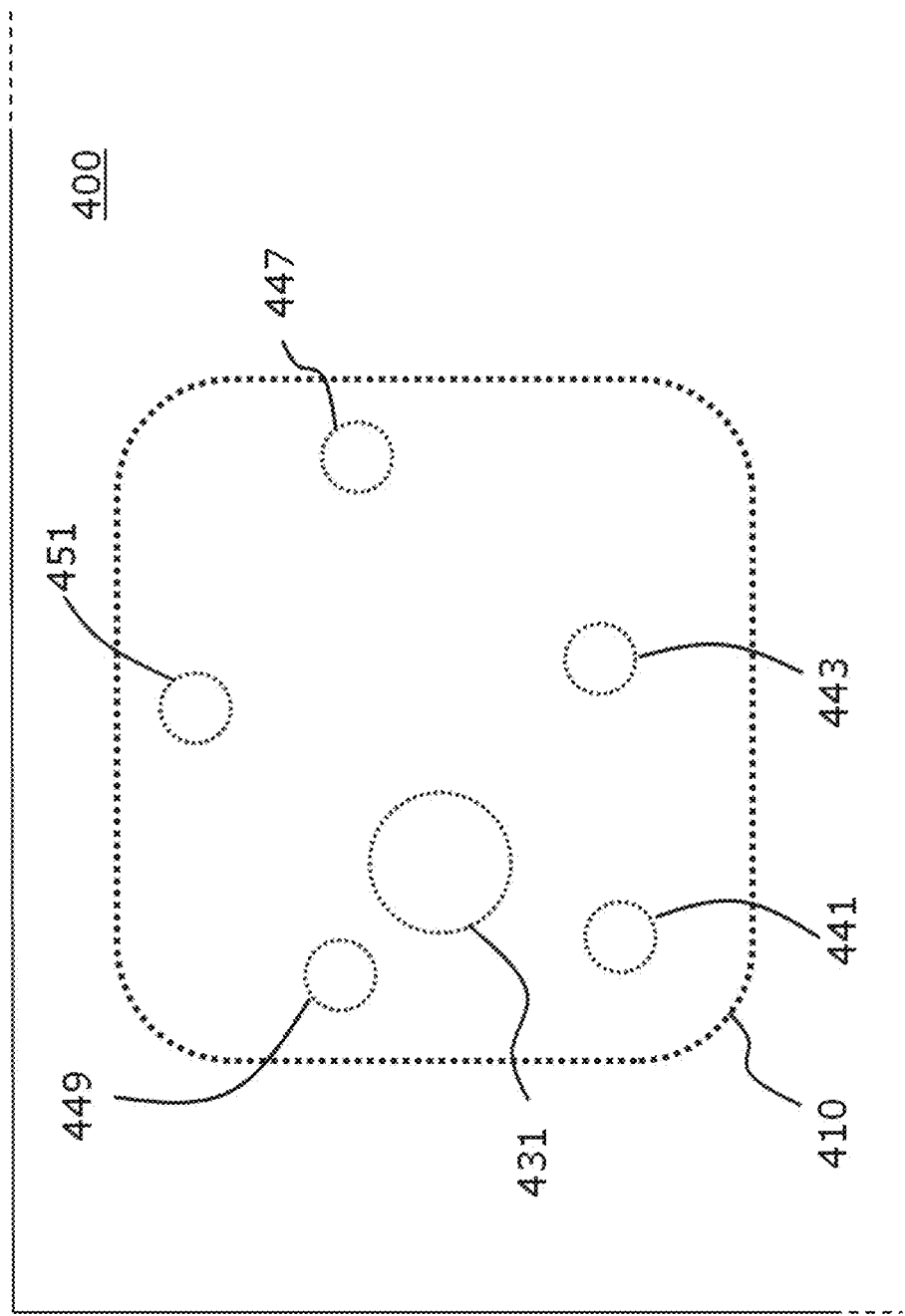

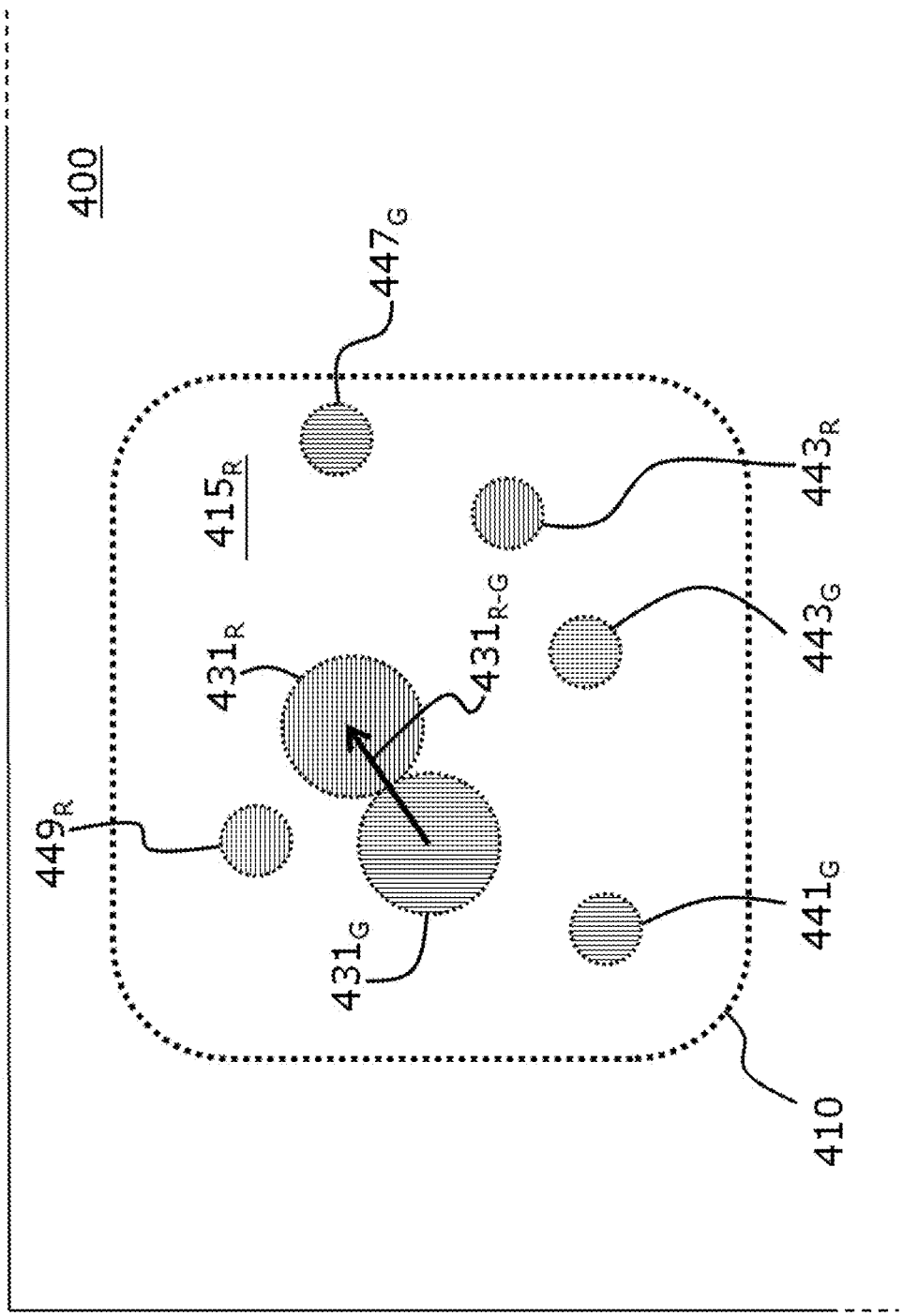

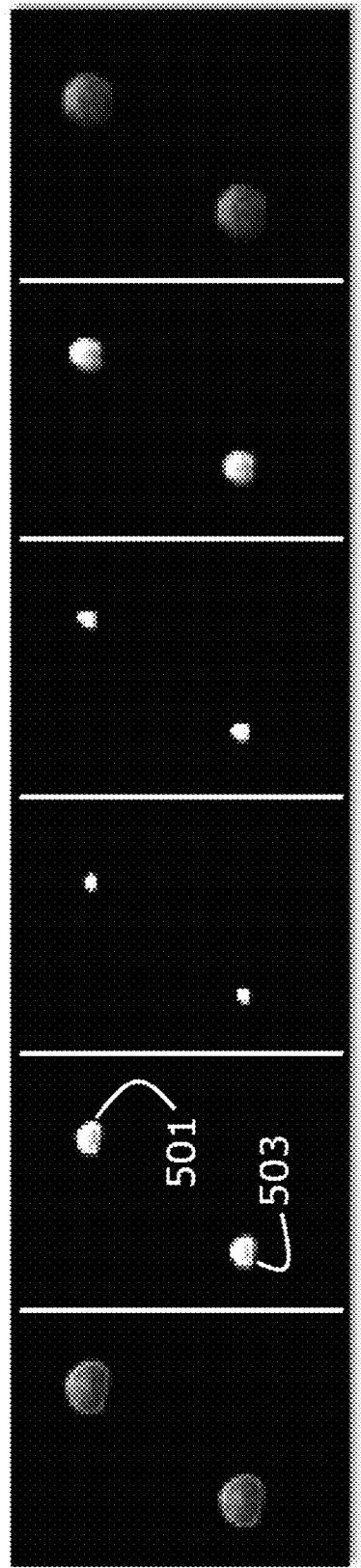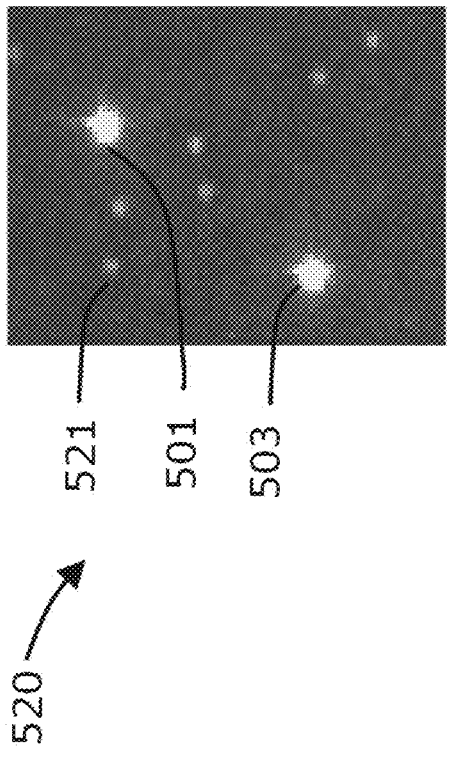
Figure 5A
Figure 5B

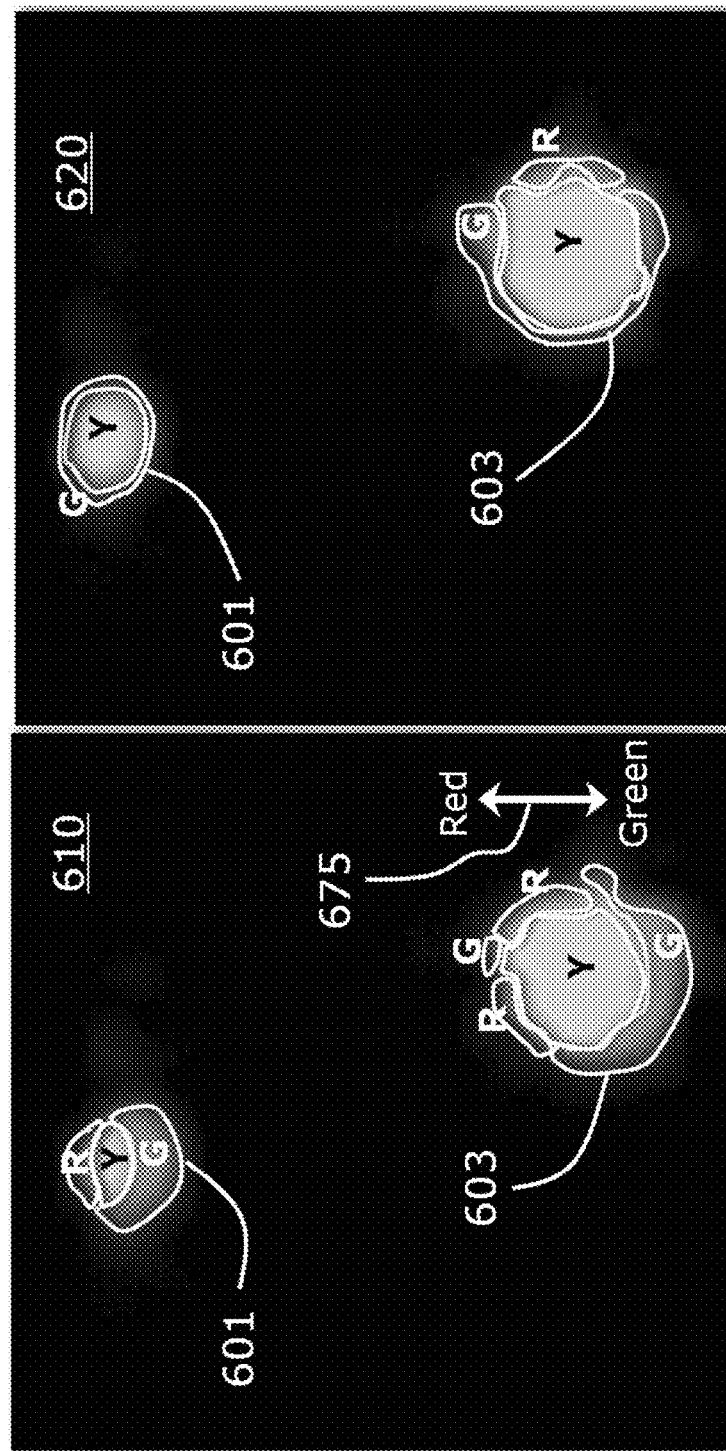

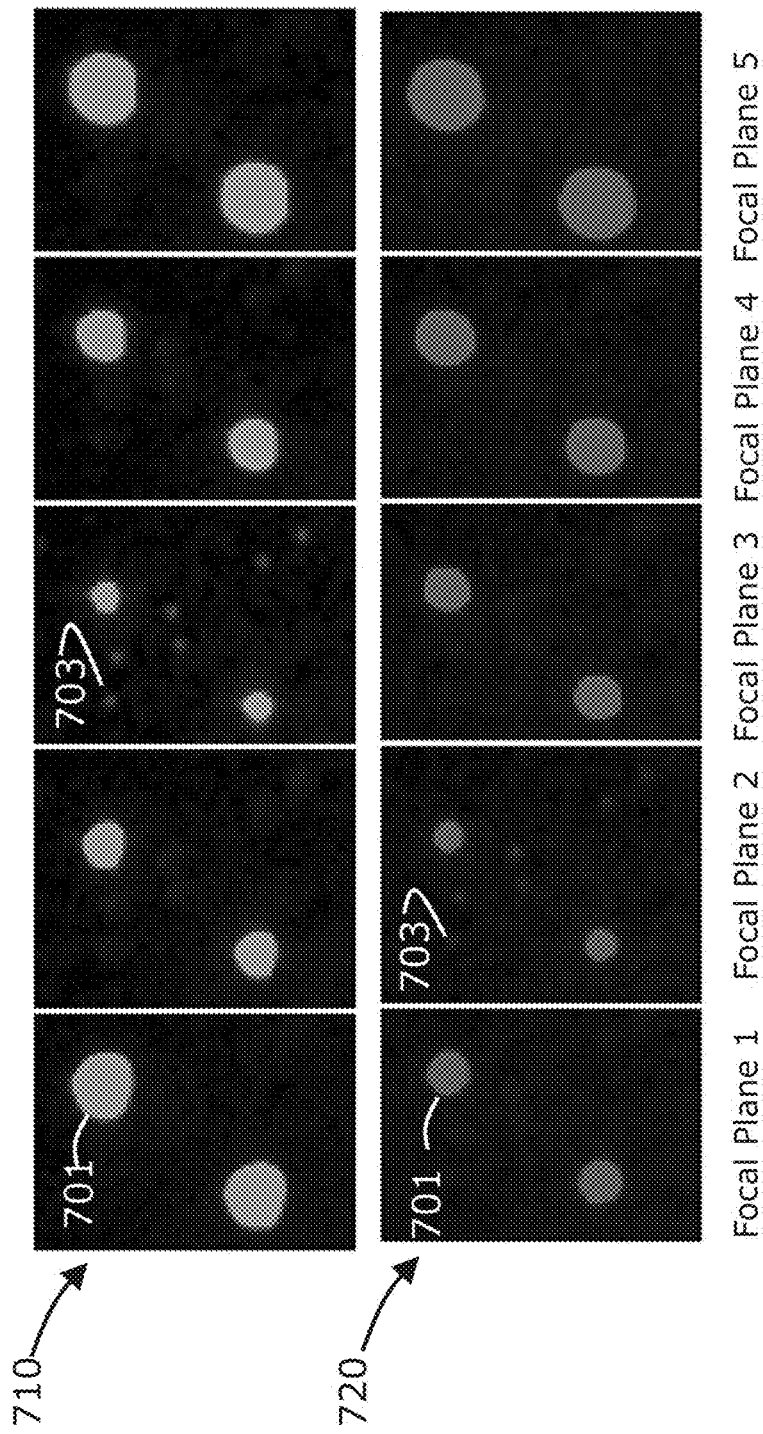

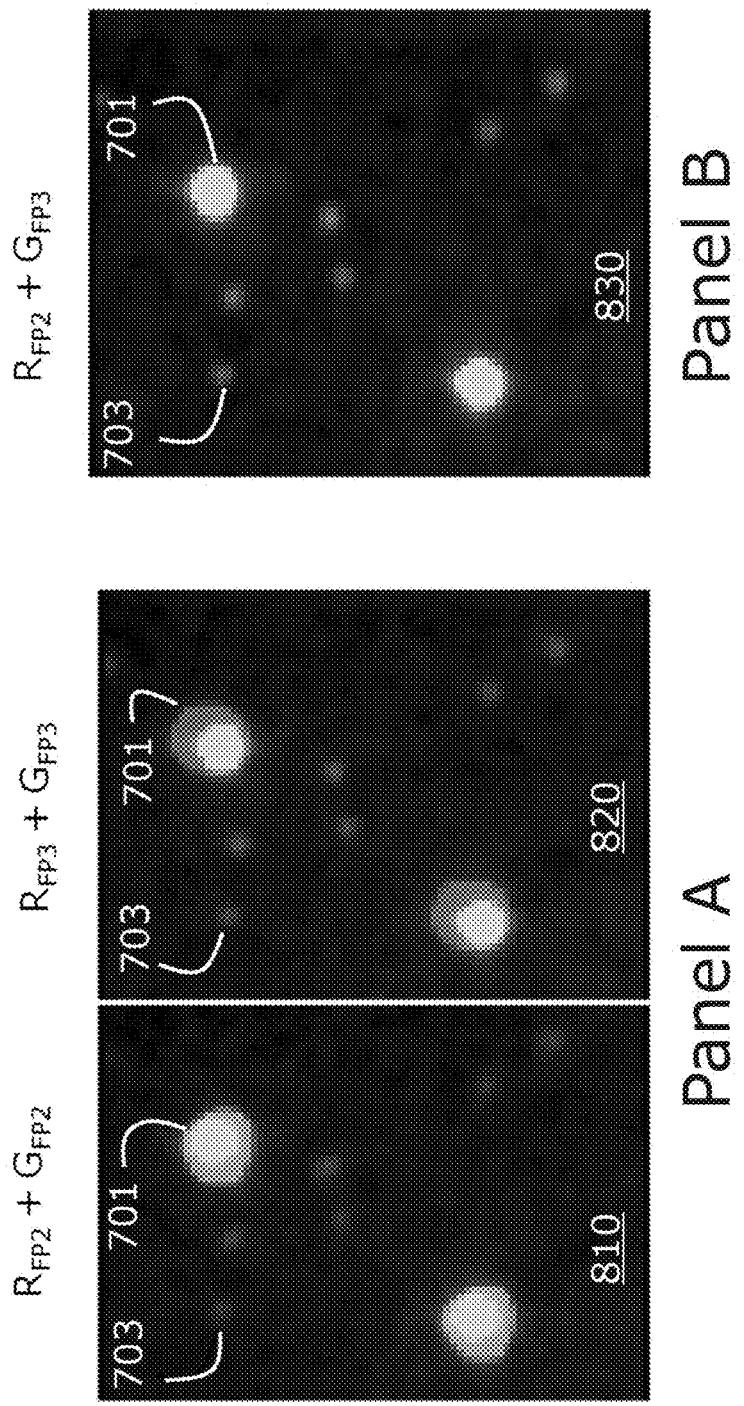

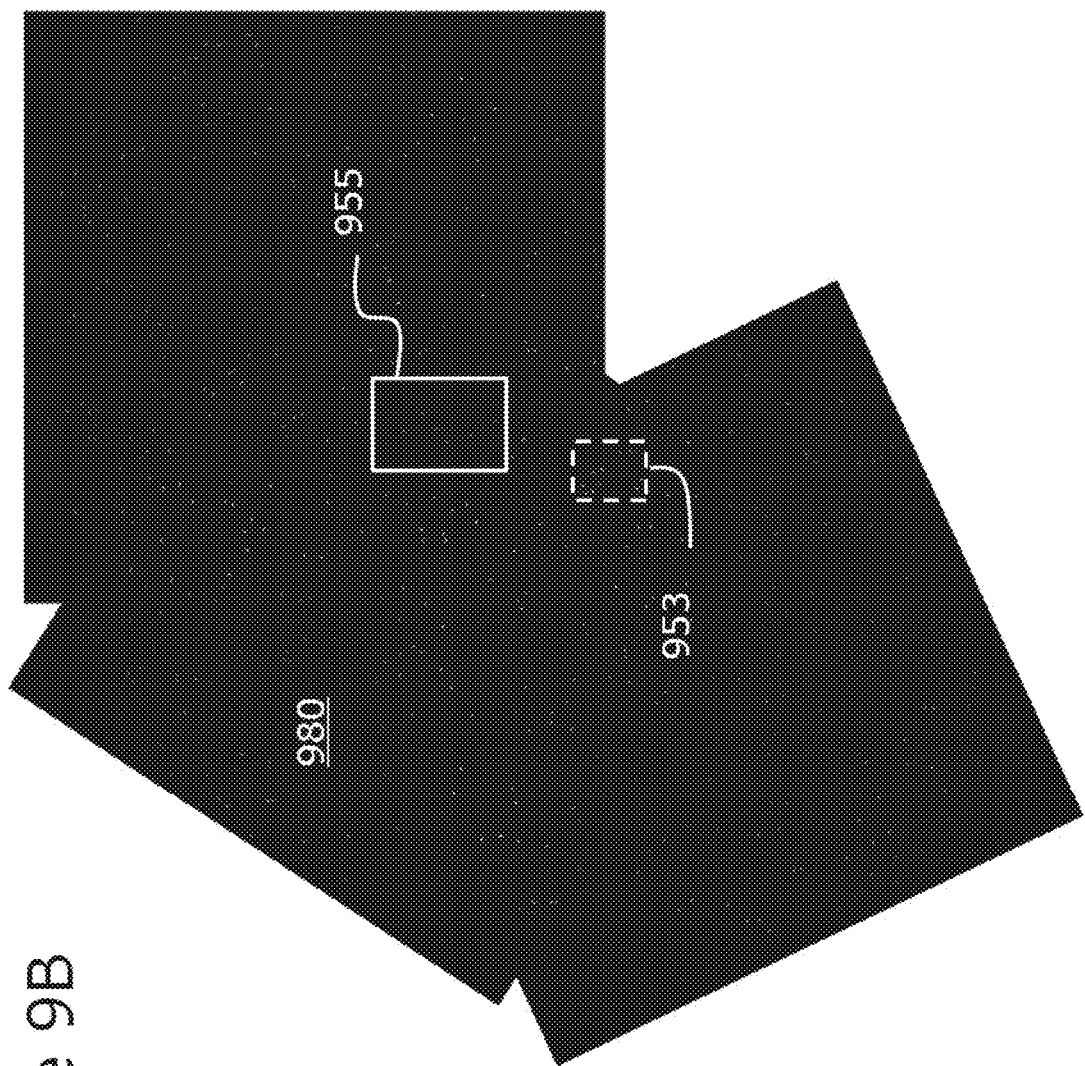

USE OF MICROPARTICLE ADDITIVES TO SIMULTANEOUSLY ENABLE ARTIFACT-FREE IMAGE REGISTRATION, AUTO-FOCUSING, AND CHROMATIC ABERRATION CORRECTION IN MICROSCOPY

RELATED APPLICATION(S)

This application is a continuation of U.S. application Ser. No. 14/680,573, filed Apr. 7, 2015, which claims the benefit of U.S. Provisional Application No. 61/976,114, filed on Apr. 7, 2014. The entire teachings of the above application(s) are incorporated herein by reference.

BACKGROUND OF THE INVENTION

In many fields, imagers are used to examine particles that have been deposited on planar substrates. For example, a microscope can be used to examine blood cells that have been deposited in a thin layer on a glass slide.

In some of these fields, such as cellular astronomy, it is desirable to examine deposited particles in a systematic manner, for example by examining all of the particles within a selected zone (an "examination zone") on the substrate. See, e.g., Howard M. Shapiro, *Cellular Astronomy—A Foreseeable Future in Cytometry*, 60A CYTOMETRY PART A 115-124 (2004). Because the examination zone is usually larger than the field of view of the imager, a systematic examination of deposited particles generally requires dividing the examination zone into regions, each no larger than the imager's field of view, and serially imaging those regions.

The systematic imaging of particles under these conditions requires addressing one or more of the following three challenges: first, how to quickly, effectively, and at least semi-automatically focus the imager on the particles in each region prior to acquiring an image (the auto-focus challenge); second, how to combine the regional images to represent some or all of the examination zone (the image registration challenge); and third, in the case of optical imaging systems, how to compensate for chromatic aberration. Each of these challenges is briefly addressed below.

The auto focus challenge. Before regional images are obtained, an imager will typically perform a focusing step to determine an optimal focal plane. The optimal focal plane will often be chosen to coincide with (or come acceptably close to) the average level of the particles to be imaged. It may be necessary or desirable to repeat the focusing step before images of additional regions are acquired, especially when the planar substrate is not sufficiently flat at a microscopic level, causing the optimal focal plane to vary unacceptably from region to region. In optical microscopy, for example, focusing can be achieved by varying the distance between the objective lens and the microscope stage. To achieve this, the stage can be moved in the z direction (orthogonal to the plane of the stage) while the optics remain fixed, or vice versa.

When objects being imaged exhibit low contrast or are viewed under conditions of low resolution, auto-focusing can be especially challenging. For example, because cells are mostly water and are not strongly absorbing in the visible spectrum, they can exhibit low contrast when imaged in an aqueous medium under brightfield conditions without having first been stained by an agent that absorbs visible light. Further, at sufficiently low magnifications, the finite spatial resolution of imaging system components (e.g., of a lens or of a digital detector) can become manifest. For example, at low magnifications, image signals may impinge on too few detector pixels to capture fully the image details. One resolution-limiting phenomenon is known as the "partial volume effect." This effect occurs where image detail is not appropriately contained within a pixel of a detector and instead "spills over" into one or more neighboring pixels. Image intensity is thereby diluted over these neighboring, partially filled pixels, and both object features and background features partially contribute to the pixel signal. Intensity values in an image are distorted, such that, for example, a small bright object will appear to be larger and dimmer than it should.

Commercial autofocus methods and algorithms can partially or fully automate the focusing step. Even using automated methods, however, the process of focusing on some particles can be challenging and time consuming. These challenges are particularly acute in the context of many cellular astronomy and other screening applications. Such applications are often performed under conditions designed to increase speed or throughput at the expense of image contrast, image resolution, or both. For example, low image magnification can lead to a lack of contrast against background. Lack of contrast makes it difficult for automated focusing algorithms to operate efficiently.

In addition, where high throughput is important, particles, such as cells, are frequently viewed at low, zero, or even negative magnification in order to increase the number of particles within an imager's field of view. Although this has the potential to improve screening times, low magnification decreases the quality (resolution) of image data available to the auto-focuser, making it more difficult and more time consuming for the auto-focuser to determine when an object is in optimal focus. Sometimes, the signal associated with a cell is registered by only a few, or even just one, pixel of a detector, making focusing, including auto-focusing, especially difficult.

Existing methods to address the auto-focus challenge suffer from limitations. For example, the utilization of physical markings in the substrate induces the auto-focuser to focus on the substrate, and not necessarily on the particles (e.g., cells) that are on or above the substrate. This can result in the introduction of out-of-focus artifacts that reduce image quality and signal-to-noise ratio, particularly at lower magnifications or with high depth of field. The use of range-finding methods requires the incorporation of expensive optical sensors and feedback loops (often costing thousands of dollars), and it adds to the overall complexity of the imaging apparatus. Using fluorescence channel methods can lead to potential fluorophore photobleaching or require fluorescence compensation in the event that multiple fluorophores are used, thereby complicating sample preparation and potentially impeding the quantitative analysis of cellular markers.

The image registration challenge. The second challenge with systematic examination of large numbers of particles, such as cells, for example, is the post-acquisition registration of data, information, or images. This is necessary, for example, to create an accurate "panorama" of the examination zone by combining data or images from the various regions. Image registration can also be required when superimposing multiple images of the same region, each corresponding to a different wavelength of light. In multi-color fluorescence spectroscopy, for example, multiple images can be taken, each image capturing target details at a particular wavelength (or color) and these images are then registered and superimposed. The fundamental challenge relates to the alignment, combination, superposition, or mapping of multiple images that represent the targets, where each image has its own coordinate system. Image registration can involve the transformation of each image into a common coordinate set. This common coordinate set can be chosen such that when images are combined, image details that arise from a target at a given location on the substrate are co-localized.

To facilitate this registration step, the regions are often chosen to be slightly smaller than the imager's field of view, so that each image includes not only an image of a full region, but a portion of one or more bordering regions as well. This overlap between images can aid the alignment of multiple images, because corresponding features of an object, appearing in more than one image, can be used as alignment markers. Such markers are known in the art as fiducial markers, fiduciary points, or reference points. Reference points can be incorporated into the substrate ("hard-coded fiduciary points"), or they can be extracted from the sample itself ("soft-coded fiduciary points").

Existing methods to address the imaging registration step suffer from limitations. Achieving image registration through the use of "soft-coded fiduciary points" requires the acquisition of cellular images to be followed by post-processing to extract patterns within the sample that can be used to align neighboring fields-of-view. As with the process of focusing prior to image acquisition, the process of image registration can be time consuming and computationally complex, particularly when the object to be imaged lacks clearly defined internal landmarks. This is often the case when imaging cells, which are irregular in shape and of low-contrast in many imaging situations, such as in bright-field microscopy, if the cells are unstained and viewed at low magnification, a situation commonly encountered in cellular astronomy. The incorporation of hard-coded fiduciary points into a substrate requires substrate modification, which can be expensive or require complex manufacturing processes. Further, hard-coded fiduciary points within or below the matrix of the substrate would probably not be within the focal plane of the cells, and while those above the matrix of the substrate might be within the focal plane of the cells, they could physically interfere with the deposition of cells onto the surface, decrease the effective area for cells to occupy, or require complex manufacturing (e.g., micropatterning).

The chromatic aberration correction challenge. In optics, chromatic aberration is a distortion wherein optical components (e.g., lens or objective) do not focus all wavelengths of light to the same convergence point. Chromatic aberration can be particularly problematic in some imaging modalities, such as when viewing cells that have been treated with fluorescent labels (e.g., "green" and "red" labels) that bind selectively to specific cell types or subtypes. Some cells will bind only green labels, others will bind only red labels, some will bind neither label, and some will bind both. This can allow determination of a cell's type or subtype by visualizing the color emitted by the label(s) tagging that cell.

In one type of experiment, two successive component images are taken, such as, for example, a first wherein only fluorescence from the green labels is received by a detector, which is used to create a "green image," and a second wherein only fluorescence from the red labels is received by the detector, which is used to create a "red image." The green and red images are registered and then overlaid. In this overlay, cells tagged with the green label appear green, cells tagged with the red label appear red, and cells tagged with both labels appear yellow (the combination of red light and green light). From this overlay, cell types and subtypes can be assigned to individual cells based on color.

Proper registration of the green and red images is essential to an accurate assignment of cell types and subtypes in this manner. Registration ensures that image details that arise from the same substrate coordinates are mapped to the same coordinates of the image space, e.g., red and green light that arises from a particular cell is mapped to the same coordinates on the green image and the red image. Accordingly, when properly registered images of a cell tagged with both green and red labels are overlaid, the result is a single yellow dot (a combination of green light and red light). If the green and red images are not properly registered, however, the overlaid image could instead show two dots, one green and the other red, erroneously suggestive of two singly-labeled cells. One challenge, described above, with image registration is correctly aligning images that are taken of different regions of a substrate. Another challenge is aligning multiple images taken of the same region of a substrate, where the extent of chromatic aberration is appreciable.

Chromatic aberration can pose a significant challenge to the registration of images obtained using different wavelengths of light because light emanating from a particular region of the substrate maps to different image coordinates. This aberration requires correction before the images are overlaid. In some applications, the need to correct chromatic aberration before overlaying images is particularly acute. In cellular astronomy, for example, cells are a few pixels big, which is of the order of the chromatic aberration shift. The magnitude of the shift relative to the image size could confound classification of cells based on their fluorescence (e.g., red or green-label) profile.

Prevention or mitigation of chromatic aberration can require a substantial investment in equipment. Correction for chromatic aberration can be challenging for a variety of reasons. For example, it can be difficult even to quantify the extent of chromatic aberration. Identification of image features, e.g., green dots or red dots, that are known to correspond to each other, e.g., relate to the same cell, can be challenging. In addition, the extent of chromatic aberration can depend not only on wavelength but also on position in the x-y plane of the substrate.

In summary, existing methods for autofocusing and image registration are limited in their scope, utility, and/or versatility, particularly under the conditions often encountered in high throughput methods such as cellular astronomy. Accordingly, there exists a need for new and improved methods for quickly and efficiently focusing on particles deposited on planar substrates prior to image acquisition and for quickly and efficiently registering and aligning multiple images post-acquisition. There exists a particular need for methods and techniques that can simultaneously or sequentially achieve both quick and efficient autofocusing and image registration. There exists a further need for such methods that can be extended to correcting or compensating for chromatic aberration, within or between images.

SUMMARY OF THE INVENTION

In one embodiment, the invention relates to a method for using an imager having an auto-focuser to acquire target information from subject targets on a planar substrate, comprising the steps of: forming a mixture of subject targets and facilitative targets on a planar substrate; in a first focusing step, using the auto-focuser, focusing the imager with respect to facilitative targets within a first region; and in a first imaging step, without refocusing the imager, using the imager to acquire information within the first region from at least subject targets. In preferred embodiments, the subject targets are cells and the facilitative targets are microparticles.

In another embodiment, the invention further relates to the imager acquiring, during at least one of the first focusing step and the first imaging step, first region facilitative target information. The following additional steps, in addition to those of the preceding paragraph are then performed: using the auto-focuser, focusing the imager with respect to facilitative targets within a second region; in a second imaging step, without refocusing the imager, using the imager to acquire target information within the second region from at least subject targets, wherein during at least one of the second focusing step and the second imaging step the imager acquires second region facilitative target information; and registering the acquired target information from the subject targets within the first and second regions, using the first region facilitative target information and the second region facilitative target information. In preferred embodiments the registration step is performed using first region facilitative target information and second region facilitative target information obtained, respectively, during the first and the second focusing steps. In preferred embodiments, the subject targets are cells and the facilitative targets are microparticles.

In another embodiment, the invention relates to the first focusing and first imaging steps, as described above, being performed at a first wavelength band. The following additional steps are then performed: in a second focusing step, using the auto-focuser, focusing the imager at a second wavelength band with respect to facilitative targets within the first region; and in a second imaging step, without refocusing the imager, using the imager to acquire information at the second wavelength band from subject targets within the first region. In preferred embodiments, the invention further comprises the step of overlaying the information acquired from the subject targets at the first and the second wavelength bands. In preferred embodiments, the subject targets are cells and the facilitative targets are microparticles.

In another embodiment, the invention relates to a method for registering target information acquired by imaging subject targets within a plurality of regions in an examination zone of a planar substrate, comprising the steps of forming a mixture of subject targets and facilitative targets on a planar substrate; using the imager, acquiring target information from subject targets and facilitative targets within a first region within the examination zone; using the imager, acquiring target information from subject targets and facilitative targets within a second region within the examination zone; and registering the acquired target information from the subject targets within the first and the second regions, using the information acquired from the facilitative targets within the first and second regions. In preferred embodiments, the subject targets are cells and the facilitative targets are microparticles.

In yet another embodiment, the invention relates to a method for correcting chromatic aberration in an optical image of subject targets, comprising the steps of forming a mixture of subject targets and facilitative targets on a planar substrate; acquiring first wavelength image data and second wavelength image data for the mixture of subject targets and facilitative targets on the planar substrate, the first wavelength image data and the second wavelength image data comprising, for at least one facilitative target, first wavelength apparent position data and second wavelength apparent position data; generating a transformation function from the difference between the first wavelength apparent position and the second wavelength apparent position for the at least one facilitative target; and applying the transformation function to at least one subject target to correct for chromatic aberration. In preferred embodiments, the first and the second wavelength apparent position data include representations of (a) positions in a plane coplanar with the planar substrate; (b) positions along an axis orthogonal to the planar substrate; or (c) positions in a plane coplanar with the planar substrate and positions along an axis orthogonal to the planar substrate. In preferred embodiments, the subject targets are cells and the facilitative targets are microparticles.

In a preferred embodiment, the invention relates to fluorescence compensation-free and artifact-free methods to create registration (fiduciary) points within a cellular sample deposited on a substrate, so as to enable multi-image stitching without disturbing the distribution of cells, and also to create high-contrast reference points within or near the cellular focal plane to enable microscopic auto-focusing.

In another preferred embodiment, the invention relates to the use of high-contrast, cell-sized object microparticles as facilitative targets for image registration and auto-focusing in microscopy. In some embodiments the microparticles are glass microbeads.

In another preferred embodiment, facilitative targets/microparticles are added to the cellular sample prior to deposition upon the substrate for cell-image analysis, resulting in a random distribution of microparticles upon the substrate.

In yet another preferred embodiment, the microparticles have density, physical dimensions and image contrast properties that enable them to settle at the same focal plane as subject targets (e.g., cells), not to occlude cells or disrupt their natural patterning/packing, and to act as high-contrast fiduciary points for both auto-focusing and image registration.

In another embodiment, the invention relates to a method for using an imager having an auto-focuser to acquire target information from subject targets on a planar substrate, comprising the steps of forming a mixture of subject targets and facilitative targets on a planar substrate; using the auto-focuser, focusing the imager with respect to facilitative targets within a first region to obtain at least one optimized focal parameter; refining the at least one optimized focal parameter to determine a refined focal parameter for subject targets; refocusing the imager using the refined focal parameter; and acquiring information from subject targets within the first region. In a preferred embodiment, the refining step consists of adjusting the at least one optimized focal parameter by a fixed offset. In preferred embodiments, the subject targets are cells and the facilitative targets are microparticles.

The invention offers new, improved, and versatile methods and techniques for autofocusing on targets deposited on planar substrates, registering images of such targets, and, in particular, for performing or enabling autofocusing and image registration, either simultaneously or sequentially. The invention further provides new and improved methods for correcting or compensating for chromatic aberration.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

The patent or application file contains at least one drawing executed in color. Copies of this patent or patent application publication with color drawings will be provided by the Office upon request and payment of the necessary fee.

FIGS. 2A, 2B, and 2C depict a substrate showing subject target particles and facilitative target particles surrounded by medium, wherein the particles are disposed at or near the substrate (FIG. 2A), intermediate the substrate and the surface of the medium (FIG. 2B), and at or near the surface of the medium (FIG. 2C).

FIG. 3 is a depiction of an examination zone of a substrate, onto which subject targets and facilitative targets have been deposited, the examination zone having been divided into virtual regions for serial examination by an imager (not shown) according to principles of the present invention.

FIG. 4A is a depiction of a region of a substrate containing subject target particles (cells) and facilitative target particles (microparticles), according to principles of the present invention, some of which have been labeled with green fluorophore, red fluorophore, or both.

FIG. 4D is a superposition of the green fluorescence image of FIG. 4B and the red fluorescence image of FIG. 4C, according to principles of the present invention.

FIG. 5A is a series of brightfield optical images of a mixture of beads and cells taken at short acquisition times to determine an optimal focal plane, according to principles of the present invention. Only beads were visible.

FIG. 5B is a brightfield optical image of the same mixture of beads and cells, taken using the optimal focal plane determined from the experiments depicted in FIG. 5A, but with a longer acquisition time. Both beads and cells were visible.

FIG. 6 shows fluorescence images of beads and cells, generated by overlaying red and green channel images. Panel A shows the result of performing the overlay without first correcting for chromatic aberration. Panel B shows the result of performing the overlay after correcting for chromatic aberration in the x-y plane (plane of the substrate) according to principles of the present invention.

FIG. 7 shows series of red-channel and green-channel fluorescence images of beads and cells at different focal planes. Because of chromatic aberration in the z-axis (orthogonal to the plane of the substrate), the optimal focal planes for the red and the green channels do not coincide.

FIG. 8 shows overlays of red and green channel fluorescence images.

FIG. 9B shows the result of stitching together the images of FIG. 9A, according to principles of the present invention.

DETAILED DESCRIPTION OF THE INVENTION

Figure 1:
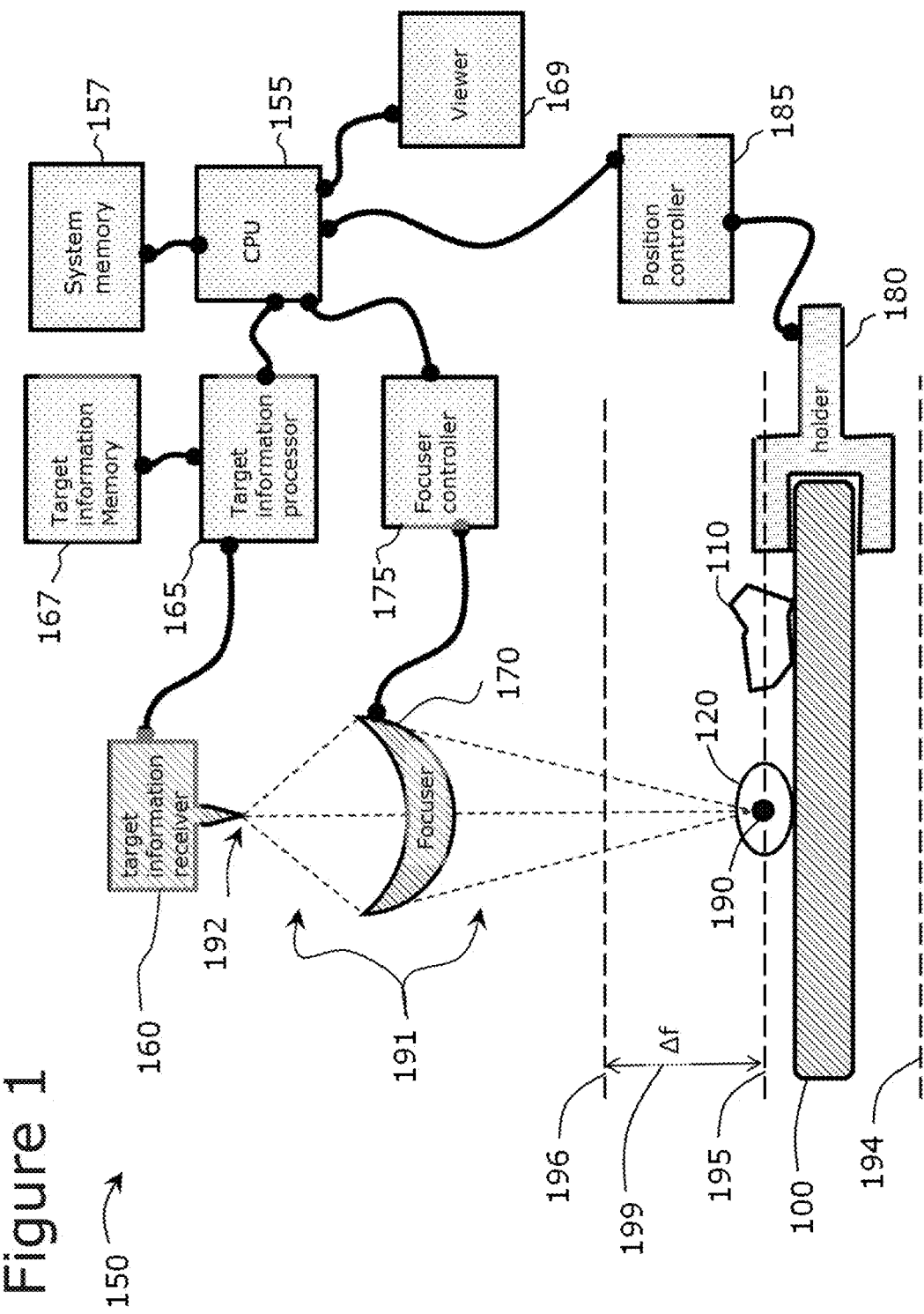
FIG. 1 is a depiction of an imager apparatus and target particles deposited on a planar substrate, according to principles of the present invention.

A description of example embodiments of the invention follows.

The relevant teachings of all patents, published applications and references cited herein are incorporated by reference in their entirety.

Definitions

Unless otherwise defined, all technical and scientific terms used herein have the same meaning as commonly understood by one of ordinary skill in the art to which this invention pertains.

"Biological material," as used herein, refers to a product of a living organism. In some embodiments, biological materials are (a) biological fluids, e.g., blood, urine, cerebrospinal fluid, interstitial fluid, sperm, amniotic fluid, ascites, bronchial lavage, effluent pleural fluid, joint fluid, saliva, pericardial fluid, cervical fluid, and mucous; (b) components of biological fluids, e.g., cellular and sub-cellular particles; (c) cells, e.g., human cells, eukaryotic cells, prokaryotic cells, primate cells, blood cells, red blood cells, white blood cells, tumor cells, circulating tumor cells, cervical cells (Pap smear) and platelets; (d) portions or products of cells, e.g., sub-cellular particles, proteins and nucleic acids; (e) biomarkers; and (f) materials from clinical tests or procedures, e.g., anal smear, cervical smear, and buccal smear. Some biological samples can contain added non-biological materials, such as polymers, surfactants, salts, biomolecules, or other reagents useful in cell processing.

"Particle," as used herein, refers to a discrete quantity of matter having a wide range of sizes. For example, particles can have a major diameter in the range of from about 3 nM to about 3 mM. A preferred range of particle size is from a major diameter from about 10 nM to 1 mM. Another preferred range of particle size is from a major diameter from about 0.5 uM to 100 uM. Yet another preferred range of particle size is from a major diameter from about 50 nM to 5 uM. Still another preferred range of particle size is from a major diameter from about 1 uM to about 60 uM.

"Microparticle," as used herein, refers to a particle having a major diameter in the range of from about 10 nM to about 1 mM. A preferred range of microparticle size is from a major diameter from about 0.1 uM to about 100 uM. Another preferred range of microparticle size is from a major diameter from about 1 uM to about 60 uM.

"Biological particle," as used herein, refers to particles that are biological materials, as well as to non-biological particles that bind to, attach to, or encapsulate a biological material.

"Cellular astronomy," as used herein, refers to the field described in Howard M. Shapiro, *Cellular Astronomy—A Foreseeable Future in Cytometry,* 60A CYTOMETRY PART A 115-124 (2004). The field of cellular astronomy relates, in some aspects, to the systematic examination of very large numbers of cells by first spreading the cells over the surfaces of one or more substrates, and by then using imaging technology to systematically examine the cells. Typically, an imager, such as a microscope, starts by simultaneously examining cells visible within a field of view, and continues by moving the field of view across the substrate, continuing region by region until the desired portion of the substrate had been imaged.

Aspects of the invention relating to methods, techniques, and devices for using microparticle additives to solve both the autofocus and image registration challenges are illustrated with reference the figures, which are not intended to limit to limit the scope of the invention.

FIG. 1 depicts imager targets ("targets") 110 and 120, deposited on a planar substrate 100, and positioned for examination, interrogation, or study by imager 150 according to principles of the present invention. Target 110 is the desired or intended subject of the examination (hereinafter, the "subject target"). Target 120 facilitates aspects of the imaging process of the subject target and is referred to hereinafter as the "facilitative target."

In preferred embodiments, subject target 110 is a cell, and facilitative target 120 is a microparticle additive, as more fully described below, but it should be appreciated that a variety of targets 110 and 120 can be used, including, without limitation, biological material, particles, biological particles, and cells. Likewise, in preferred embodiments facilitative target 120 is not tethered to, covalently bonded to, or embedded in substrate 100, but such tethering, bonding, or embedding is within the scope of the invention. Similarly, although FIG. 1 depicts the targets 110 and 120 as being on the surface of planar substrate 100, targets 110 and 120 can exist at a variety of distances from the surface. This may occur, for example, when targets are suspended in a medium such as an aqueous medium (e.g., blood, serum) or an organic medium (e.g., glycerol) or are embedded in a matrix.

A variety of objects can serve as planar substrate 100, including Petri dishes and slides. The substrate can have a variety of shapes, including circular, square, and rectangular. Similarly, substrate 100 can be formed from a wide variety of materials, including glass, quartz, or other minerals, and plastic or other polymers. While planar substrate 100 is substantially planar on a macroscopic level, it should be appreciated that it is not necessarily planar on a microscopic level, and it may possess for example, surface roughness, imperfections, craters, peaks, ridges, scratches, warping, or deformation that contributes to a lack of microscopic planarity. Further, the invention is not limited in its applicability to planar or nearly planar substrates. In some imaging modalities, the substrate could have a curved surface, such as a section of a cylinder or sphere.

Substrate 100 is secured by holder 180, which is in turn connected to position controller 185. Position controller 185 translates holder 180 (and the substrate 100) in the x-y plane, and if desired, along the z-axis (normal to the substrate plane), as well. The holder can also rotate the substrate about an axis, such as the z-axis. When the holder is rotated rather than translated in the x-y place, it can be convenient to describe the holder's position in polar, rather than Cartesian coordinates, e.g., by (r, θ), where r represents distance from the z-axis, and θ represents degree of rotation. Holder 180 can move the substrate in a systematic manner, e.g. to enable scanning, relative to target information receiver 160. Holder 180 can take a wide variety of forms, including, for example, a microscope stage. In some embodiments, holder 180 can move substrate 100 while information receiver 160 is held in a fixed position. In other embodiments, systematic movement of the substrate 100 relative to information receiver 160 can be achieved by moving receiver 160 while substrate 100 is fixed in position along one or more dimensions. In such a configuration, position controller 185 can control the position of receiver 160, rather than substrate holder 180.

Imager 150 is positioned to receive target information 191 from targets 110 and 120. Target information 191 relates to properties of a target (e.g., target 120), and it can be contained in, embedded in, represented by, or extracted from a wide variety of physical signals including the following: electromagnetic radiation (e.g., visible light, ultraviolet light, X-ray radiation, gamma radiation, microwave radiation, radio waves, and infrared radiation), heat, sound, physical displacement, magnetic force, electrostatic force, gravitational force, mechanical force, and the presence, direction, quantity, energy, or position of particles such as atoms, electrons, positrons, and alpha-particles.

A wide variety of machines, apparatuses, and equipment can serve as the imager 150, including, without limitation, optical microscopes, electron microscopes, atomic force microscopes, acoustical microscopes, ultrasound imagers; X-ray machines; computerized tomographic imagers (CT scanners), positron emission tomographic scanners (PET scanners); fluoroscopic imagers, and magnetic resonance imagers (MRI). Further, many imagers can operate in a variety of imaging modalities. For example, optical microscopes can be configured to operate in brightfield, dark-field, and fluorescence modalities in possible combination with other modalities such as confocal. Most, but not all imagers 150 can magnify or enhance the resolution of targets relative to capabilities of the human eye. In addition, most imagers map, correlate, or associate target information (or processed information) with coordinates of the target, and most will display or represent that information as an image, picture, mapping, or graph, typically on a computer display.

For example, where imager 150 is a light microscope, and subject target 110 is an unstained human leukocyte, target information 191 can be in the form of an energy signal (an electromagnetic wave), the intensity or character of which has been altered by passing though the leukocyte. Typically, imager 150 is configured such that at least some of the information encoded in target information 191 can ultimately be perceived by a viewer 169, whether directly or indirectly, in raw or processed form, or in combination with other data or information. Where imager 150 is a light microscope, for example, the user typically perceives a color picture or image, typically in two dimensions, wherein the color or intensity of light at a given set of image coordinates corresponds to target information obtained from a given set of substrate coordinates.

As shown with respect to exemplary point 190 on facilitative target 120, target information 191 emanates toward focuser 170. Focuser 170 focuses target information 191 by altering, processing, redirecting, or otherwise affecting or changing (either in a fixed or in an adjustable manner) one or more properties, directionalities, attributes, or qualities of the target information 191 that reaches target information receiver 160 (hereinafter "received target information 192"). For example, where imager 150 is a light microscope, focuser 170 could comprise a lens, the distance between it and substrate 100 being adjusted during the focusing process. While the meanings of "focus" and "focuser," as used herein, are broad, it should be understood that these definitions include, without limitation, the ordinary meanings that one of skill in the art would attribute to these terms in the context of instrumentation for performing the imaging and other operations described herein.

It should be further understood that a wide variety of focuser configurations can be used and that focuser 170 can comprise a wide variety of components, depending on the imager 150 and the target information 191 that it is designed to focus. Focusers can exploit a variety of physical principles, including refraction, diffraction, reflection, electrostatic and magnetic forces, and quantum or relativistic effects.

Focusers can operate in a wide variety of ways, including by adjusting one or more focal parameters. As used herein, "focal parameter" includes and refers to a setting, state, configuration, position, orientation, or value that measures, identifies, relates to, correlates with, represents, or is otherwise associated with a feature, aspect, or component of a focuser (e.g., focuser 170) and/or of an imager (e.g., imager 150) component involved in focusing. Focal parameters can be adjustable or fixed. Adjustable focal parameters can be adjusted in a variety of ways, including in a fully automated, semi-automated, or manual manner. In some embodiments, adjustable focal parameters can be adjusted continuously; in other embodiments, adjustable focal parameters can be adjusted in discrete increments. In some embodiments, the adjustment can involve varying a state or property of a focuser component (e.g., changing a distance between lenses by turning a knob, or changing a voltage to a field generator); and in others, the adjustment can involve the substitution of or swapping of a component (e.g., substituting one lens for another of different strength).

A wide variety of focusers and focal parameters can be used. For example, in light microscopy, the target information 191 is in the form of light waves, and focuser 170 can be an adjustable microscope stage controlled by a focus knob. In this example, an adjustable focal parameter could be the position of a focus knob that, as it is turned, varies the distance between the sample (e.g., on an adjustable microscope stage) and a component of the imager (e.g., the objective lens or other imager optics) until the sample is brought into focus. The stage can move orthogonally to the plane of the stage while imager optics remain stationary, or vice versa. An effect of this adjustment is that the nature of the received target information 192 varies.

As another example, an adjustable focuser in an optical imager could include one or more lenses through which target information 191 passes and that are adjustable in some manner (e.g., having an adjustable focal length, strength, polarization angle, or distance between two or more lenses, or being adjustable by substitution of one lens for another). Again, an effect of this adjustment is that the nature of the received target information 192 varies.

Other types of imagers could require focusers that use (preferably adjustable) electric or magnetic fields (including dipole and quadrupole fields), resonance tuners, filters, or other devices. As an example, focuser 170 could alter properties of target information 191 as it passes through a field e.g., an electric or magnetic field, of variable intensity or direction; and focal parameters could include the electric or magnetic field strength or direction, voltage inputs into imager components that generate/adjust the fields, and/or numerals or other representations, whether in analog or digital form, that correspond to field strength of direction.

In some embodiments target information 191 passes through or interacts with focuser 170, such as is depicted in FIG. 1. In other embodiments, target information 191 does not pass through or interact with focuser 170 in this manner, such as where the focuser is an adjustable microscope stage controlled by a focus knob, as described above.

Received target information 192 is received by target information receiver 160, and it is communicated to target information processor 165 and stored in target information memory 167, in raw or processed form. CPU 155 controls access to system memory 157, and directs and coordinates activities of the target information processor 165, viewer 169, focuser controller 175, and substrate position controller 185. Focal parameters can be communicated between focuser 170, focal controller 175, CPU 155, and/or system memory 157.

Focuser 170 is managed by controller 175, which can partially or fully automate the task of focusing on targets 110/120. For example, controller 175 could execute a series of incremental adjustments until image quality (as determined by processing the received target information 192) is optimized (as closely as is desired). As a simple example, in the field of light microscopy, focuser controller 175 could repeatedly turn the focus knob of the microscope by an incremental amount, until the image is optimized, i.e., reaches an optimal level of a desired attribute, or combination of attributes, such as clarity, field of view, quality, focus, contrast, color, coherence, and/or resulting image file size. Those of skill in the art will recognize that a variety of algorithms are available to assess these, and other, image attributes. An "optimized focal parameter," as the term is used herein, includes and refers to a focal parameter that is associated with an optimized image.

Optionally, optimized focal parameters, or representations thereof, can be stored for later use, e.g., stored in computer memory for further use with the same or similar targets under similar conditions, or as the basis for further refinement. The selection of optimized focal parameters can be based not only on the desired image attributes (or set of attributes) to be optimized, but also on the imager, substrate, and/or the target/target region being imaged. Accordingly, for example, optimized focal parameters for facilitative targets can differ from the optimized focal parameters for subject targets. As discussed below, if this difference in parameters is sufficiently small or nonexistent, the same set of parameters can be used for both target types. In the alternative, as further discussed below, it is possible to refine the optimized focal parameters for the facilitative target to derive or obtain optimized focal parameters for subject targets.

As depicted in FIG. 1, target information 191 from point 190 is adjusted by focuser and optimally focused at receiver 160. Points lying along the same focal plane 195 as point 190 are also in focus. Points that lie out of plane 195 but are close to it, (i.e., the remainder of subject target 120) are also in focus to an acceptable degree. While FIG. 1 depicts optimal focus as the convergence of target information at the receiver's tip, this pictorial depiction should be understood not to limit the scope of the invention, or the meaning of focusing, as used herein.

Two suboptimal focal planes lie on either side of optimal focal plane 195, namely suboptimal deep-field plane 194 and suboptimal near field plane 196. Focal planes 194, 195, and 196 are separated in height by increments of step size 199. A wide variety of step sizes can be used, depending on the imaging equipment and the configuration parameters thereof. The step size can also be infinitely small, such that the height (or other focal parameter) is continuously variable. The stepping of focuser 170 during the autofocus routine described above results in stepping the focal plane by increment 199.

As depicted in FIG. 1, subject target 110 and facilitative target 120 are at approximately the same vertical distance (height) from the substrate, with both being positioned directly on the substrate. As a result, when the imager is autofocused on facilitative target 120, subject target 110 will also be in focus. While the above discussion relates to focal planes, it should be appreciated that focal planes are part of a broader physical phenomenon of equi-focal spaces, surfaces, and lines, in which the examination of objects can be achieved with comparable clarity using the same focus settings. The shape of these equi-focal spaces, surfaces, and lines will be determined by the type of imager, the information it collects, the physical phenomena that is exploits, and the geometry of the imager components, such as the receiver, relative to the substrate.

Returning to FIG. 1, and according to principles of the present invention, the addition of facilitative targets 120 to subject targets 110 permits the focuser 170 to focus more quickly and efficiently on a relevant focal plane. Preferably the added facilitative targets 120 are microparticles.

In preferred embodiments, the microparticles facilitate focusing by generating a strong signal relative to background (i.e., are high contrast). As used herein, contrast relates to differences between the nature, type, or intensity of target information associated with a target and information associated with background regions, non-target regions, or areas surrounding the target.

For example, in brightfield optical microscopy, a colored, and/or highly refractive (relative to water or substrate) microparticle will exhibit good contrast against a glass slide, an aqueous mounting medium, and any cells that may be present and that have not been stained to enhance absorption in the visible spectrum. Other optical properties can also lead to enhanced contrast. For example, microetching can induce a diffraction pattern in a microparticle, and faceting can refract light. Microparticles can be constructed from a variety of materials including glass, and polymeric materials, which can be fabricated with a variety of colors and refractive indexes, and minerals such as quartz. Minerals such as quartz have higher refractive indexes than glass, which can be useful in the context of the present invention.

As a further example, for X-ray imaging, microparticles can be chosen to be more radiopaque than background materials, thus providing enhanced contrast. Heavy atoms, which have appreciable x-ray attenuation coefficients, including lead and iodine can comprise, or be incorporated into materials comprising microparticles of the present invention. Those of skill in the art will recognize the properties of microparticles that exhibit enhanced contrast in the context of other types of physical signals and other types of imagers.

Figure 2B:
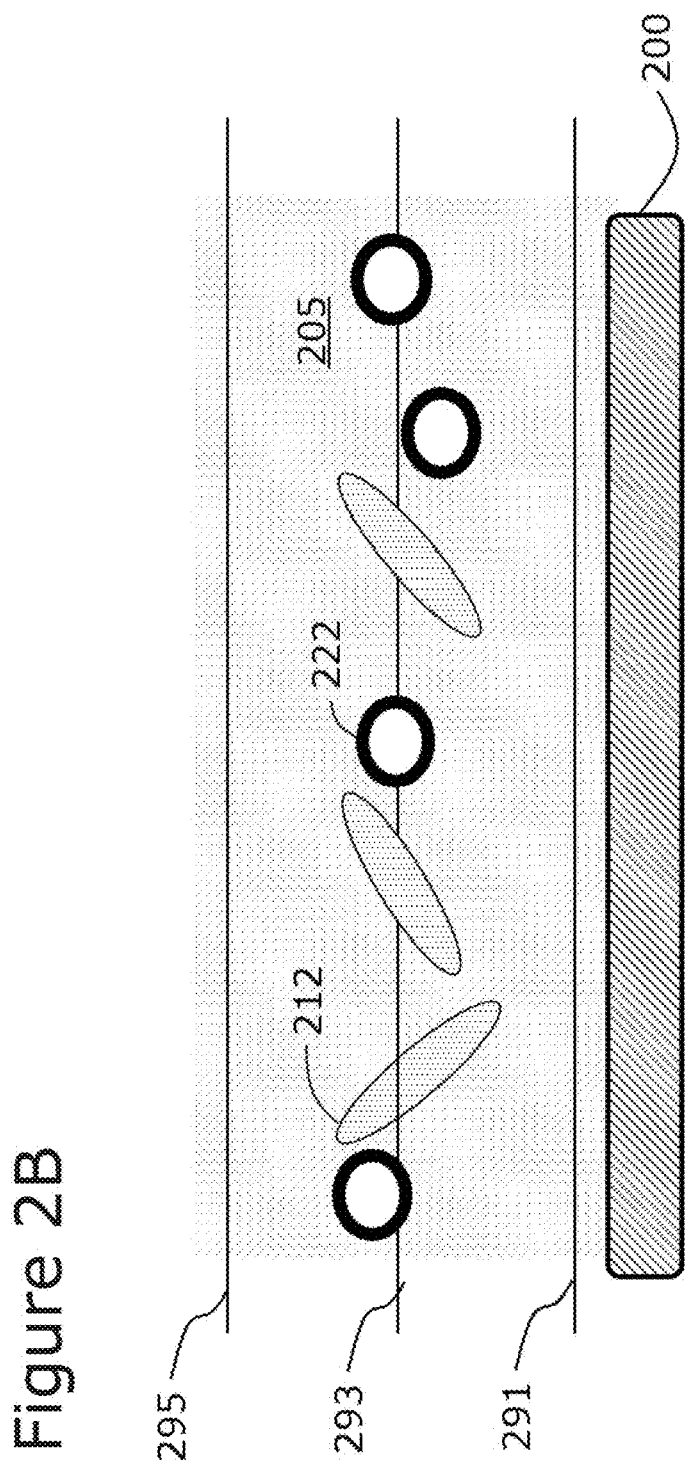

In preferred embodiments, facilitative targets 120 are chosen so that they reside in or close to the focal plane of the subject target 110. This is shown with reference to FIGS. 2A, 2B, and 2C. These Figures depict a substrate 200 with subject target particles (e.g., cells) 210, 212, 214, facilitative target particles (e.g., microparticles) 220, 222, 224, and medium 205. In FIG. 2A, subject target particles 210 and facilitative target particles 220 are both disposed at or near the surface of the substrate; in FIG. 2B, subject target particles 212 and facilitative target particles 222 are both disposed intermediate the substrate and the upper surface of the medium 205; and in FIG. 2C, subject target particles 214 and facilitative target particles 224 are both disposed at or near the upper surface of the medium 205. Also shown in each figure are three focal planes 291, 293, 295, corresponding to those available to an imager operating an auto-focuser that progresses through a step interval (not shown).

In FIGS. 2A, 2B, and 2C, the optimal focal planes are 291, 293, and 295, respectively, wherein the facilitative targets/microparticles have been chosen to reside in or nearly in the same focal plane as the subject targets/cells. For example, the microparticles can be chosen to have a buoyancy that achieves a desired disposition within medium 205), near the location of the cells. Buoyancy is readily adjusted by varying the density of a uniform microparticle material or by varying its composition, e.g., by introducing holes or pockets with materials of greater or lesser density than the medium. In addition, asymmetries in density within the microparticle can be used to control the orientation of the microparticle in solution.

Consequently, in some embodiments, an auto-focuser can focus on the facilitative targets (microparticles), and then achieve focused, or nearly focused, images of subject particles, without having to refocus. In other embodiments, optimized focal parameters for the facilitative targets (e.g., microparticles) can serve as a starting point for further refinements/focus adjustments (e.g., further adjustments to one or more focal parameters). A wide variety of refinements or adjustments can be made. One example is a fixed offset to an optimized focal parameter for the facilitative targets (e.g., microparticles), preferably by a predetermined amount. In another example, the adjustment to the optimized focal parameter for the facilitative targets is not fixed or predetermined, but is based on a further optimization of the parameter, the optimization being conducted using existing image data, newly acquired image data (e.g., of subject targets/cells), or both. Adjustments can be made to one or more focal parameters. Adjustments can involve the additional or further operation of an autofocusing routine or other algorithm, preferably using one or more previously determined focal parameters (e.g., optimized focal parameters for another type of target, substrate, substrate region, etc.) as inputs.

Figure 2D:
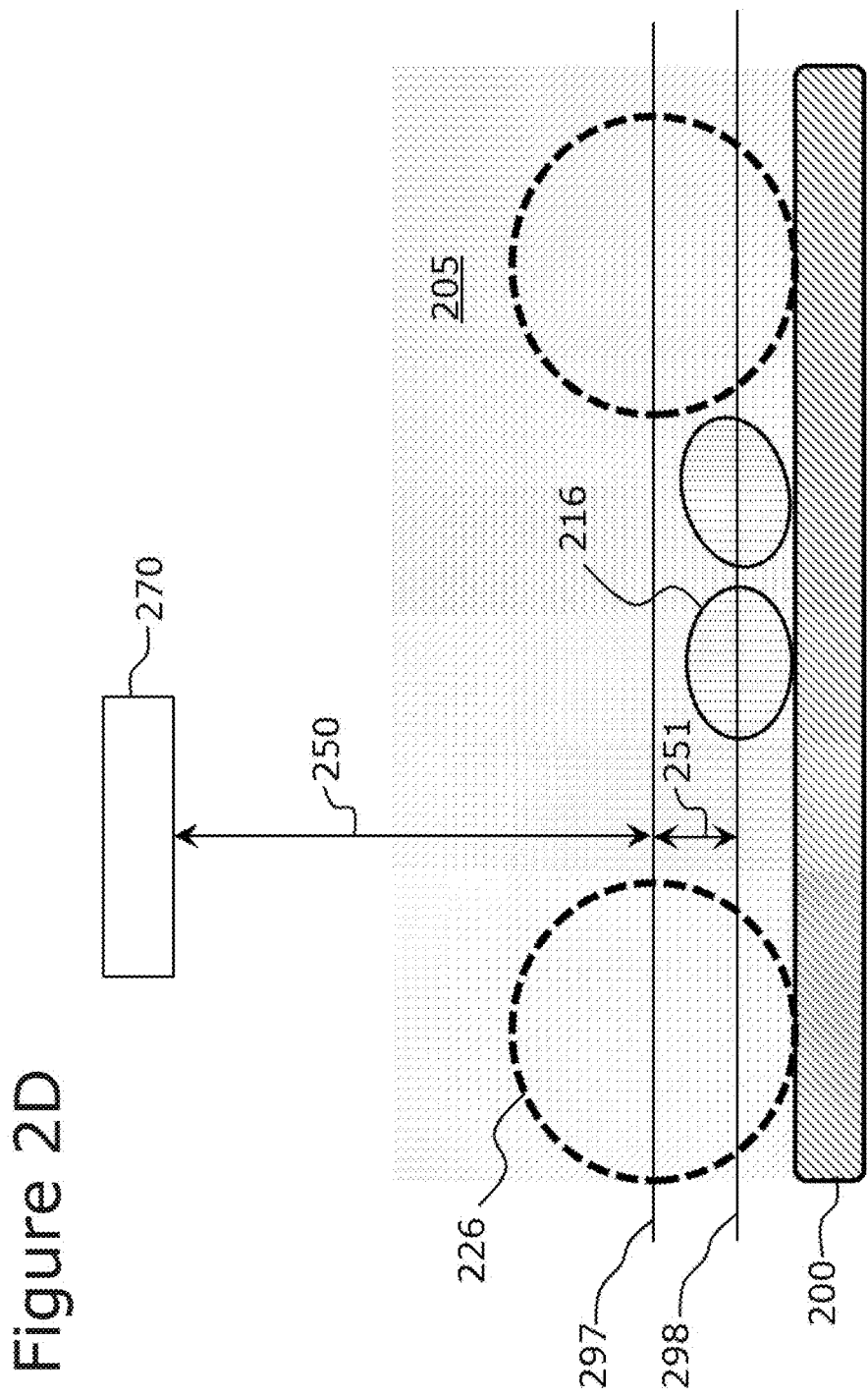
FIG. 2D depicts a substrate showing facilitative target particles and subject target particles of different sizes deposited on a substrate.

There are a wide range of situations in which it can be desirable to focus on (obtain focal parameters for) a facilitative target and then refine those parameters before obtaining further images (e.g., of a subject target). FIG. 2D provides one such example. As depicted, facilitative targets 226 and subject targets 216 are located on the top surface of substrate 200. Facilitative targets 226 have a larger diameter than subject targets 216, and the optimized focal plane 297 of the facilitative targets 226 is offset from that of optimized focal plane 298 of subject targets 216 by an amount 251. As shown in the figure, the distance 250 from focuser component 270 (e.g., a lens) to the optimized focal plane 297 for the facilitative targets 226 is an example of an optimized focal parameter for the facilitative targets. Similarly, the combined distance equal to distance 250 plus offset 251 is a corresponding optimized focal parameter for subject target 216. In some embodiments, where the offset 251 is predetermined or known, optimized focal parameter 250 is determined via autofocusing on facilitative target 226, and an optimized focal parameter for the subject targets is calculated by adding the offset 299 to parameter 250; imaging is then conducted, and the subject targets are image-optimized (e.g., in optimal focus).

In preferred embodiments, the microparticles do not move appreciably (particularly along the z-axis) between the time the imager is focused and an image of the substrate is taken. One way of controlling movement is by using dense microparticles that settle on the surface of the substrate and do not move appreciably along any of the axes. Microparticle densities can be chosen to be greater than necessary to offset buoyant forces, such that any additional forces that could contribute to suspension or lateral motion of the particles are also offset (e.g., electrostatic repulsion/levitation, thermal currents, and so on).

While microparticles can possess a variety of shapes, including spherical, oblong, cubical, faceted, and so on, microparticles having large, substantially flat faces increase contact with the substrate to minimize movement and can also have greater rolling resistance across the surface of the substrate, contributing to immobility, particular when a large flat face is weighted such that microparticles tend to land on the substrate with that face oriented downward. One preferred shape of this type is the cube. Other preferred shapes of this type include rectangular prisms, tetrahedra, pyramids, and hemispheres. Among microparticles that do not have large, substantially flat faces, a preferred shape is the sphere, which mimics the shapes of many cells. Although spheres can be more susceptible to rolling than other shapes, when the microparticles are designed to be suspended above the surface of the substrate (e.g., in the middle of, or at the top of, medium 205, it is immaterial whether the shape exhibits rolling resistance.

Both symmetric and asymmetric particles can be used. Symmetric forms such as spheres, cubes, and tetrahedrons can be advantageous in, although certainly not necessary for, auto-focusing, since these forms appear the same when viewed from above, no matter on which face the structure is lying on the substrate. Non-symmetrical (or even randomly-shaped) forms can be advantageous in, although certainly not necessary for, image registration, since this asymmetry can offer an additional way of distinguishing among fiduciary points.

It is further preferred, for purposes of using facilitative targets/microparticles to facilitate image registration (as is more fully described below) that the facilitative targets/microparticles do not move appreciably (in any direction) over the imaging time of multiple image regions within the examination zone of the substrate. Again, dense microparticles will settle on the surface of the substrate and not move appreciably along any of the axes. Other motion-limiting or immobilizing methods include the use of viscous media, matrixes, chemical tethers, and magnetic fields. For example, where the microparticles are ferromagnetic (e.g., comprised of stainless steel), a magnetic field can be introduced after the particles are deposited on the substrate, further securing the particles in position.

Finally, it is desirable that the facilitative target microparticles not obscure the cells under study or contribute to measurement artifacts. This can be achieved, for example, by selecting microparticles that are approximately the same size as, if not smaller than, the target particles under study. Size-matching of facilitative targets/microparticles to subject targets/cells can also help to ensure that the optimal focal plans of these objects are approximately coincident. For example, when cells are the subject targets/cells, it is preferred that facilitative targets (e.g., microparticles) have a size range from about 1 uM (major diameter) to about 60 uM, depending on the size of the cells. When smaller particles, e.g., viruses, are used, smaller ranges are preferred e.g., 50 nm to 1 uM. It is also preferred that the facilitative targets/microparticles have a size range from about 0.2 times to about 10 times the average major diameter of the subject targets (e.g., cells).

Most preferably, facilitative targets/microparticles are chosen such that they have a combination of desirable traits for use in autofocusing and image registration. For example, microparticles can be selected (1) to be approximately the same size as the cells under study, thereby not obscuring cells underneath them, (2) to have a density higher than the solution density (such as the density of water, for example, which is about 1 g/mL) so that they sink to the substrate surface (cellular plane), coinciding with the focal plane of substrate deposited cells and being less-prone to movement; and (3) to have a higher contrast than cells, which can be achieved in many forms of optical microscopy by using a material with a refractive greater than that of aqueous solution (e.g. water, which has an index of refraction of approximately 1) or of typical mounting media (e.g. glycerol, which has an index of refraction of about 1.46).

In some embodiments, microparticle additives suitable for autofocusing can also be used for image registration. Aspects of this method, in accordance with principles of the present invention, are depicted by reference to FIG. 3. Cells 355 (the subject targets) and microparticle additives 360 (the facilitative targets) have been deposited onto planar substrate 300, which has an examination zone 305, virtually divided into regions 321, 331, 341, 351 for serial imaging by an imager (not shown). The imager has a field of view (for example 325, 335) that is slightly larger than the area of the corresponding region (for example, 321, 331). As a result each regional image corresponds not only to the full region over which the imager is centered but also portions of adjacent images. For example, particles within the boundary defined by the intersection of field of view 325 and field of view 335 will be common to the regional images taken of regions 321 and 331. By virtue of the favorable properties of facilitative targets such as microparticles discussed above in the context of autofocusing, such targets can also facilitate image alignment and registration. Preferably, microparticles will facilitate both processes.

In a preferred embodiment, the invention relates to methods of incorporation of a population of high contrast, high-density, cell-sized microparticles into a cell-containing solution prior to deposition onto a planar substrate, and concurrently spreading the microparticle and cell-containing solution onto the substrate as a mixture. In the alternative, the cell and microparticle solutions could be applied concurrently but from separate solution containers, or one could be deposited before the other. For example, the subject targets could be deposited after, and optionally, on top of, the facilitative targets, or vice versa. Facilitative targets can be deposited in either a fixed or random pattern, and they can be applied to the substrate in a wide variety of manners, including spraying, spin-brushing, and so on.

In preferred embodiments, following imaging, which can include the acquisition of target information from a number of regions within an examination zone, the microparticles are used to facilitate image registration of these regional images or regional information.

In particularly preferred embodiments, the microparticles facilitate both autofocusing and image registration. For example, following the deposition of the subject targets and facilitative targets, an imager performs the autofocusing steps by reliance on target information from the facilitative targets, and images a region of the substrate without the necessity of changing focus. In other embodiments, a previously optimized focal parameter is adjusted, such as by a predetermined offset. The substrate is then translated in the x-y plane, a different region of the substrate is imaged, and the collected images are then registered and aligned, again relying on the same facilitative targets as fiducial markers.

In still other preferred embodiments, the microparticles are used to correct for chromatic aberration, optionally in addition to facilitating one or both of the autofocusing and image registration steps. This can reduce uncertainty in assigning fluorescent-labels with specificity for pixel-sized objects.

FIG. 4A depicts the actual positions of targets within a region 410 of a substrate 400 according to principles of the present invention. Targets lying outside region 410 of substrate 400 are not shown. The targets within region 410 include subject targets, namely, cells 441, 443, 447, 449, and 451 and a facilitative target, namely, microparticle 431. Cells 441 and 447 are labeled with a fluorophore that emits green light ("green fluorophore"); cell 449 is labeled with a fluorophore that emits red light ("red fluorophore"); cell 443 is labeled with both red and green fluorophores; and cell 451 is not labeled with either fluorophore. Microparticle 431 is labeled with both red and green fluorophores.

Figure 4B:
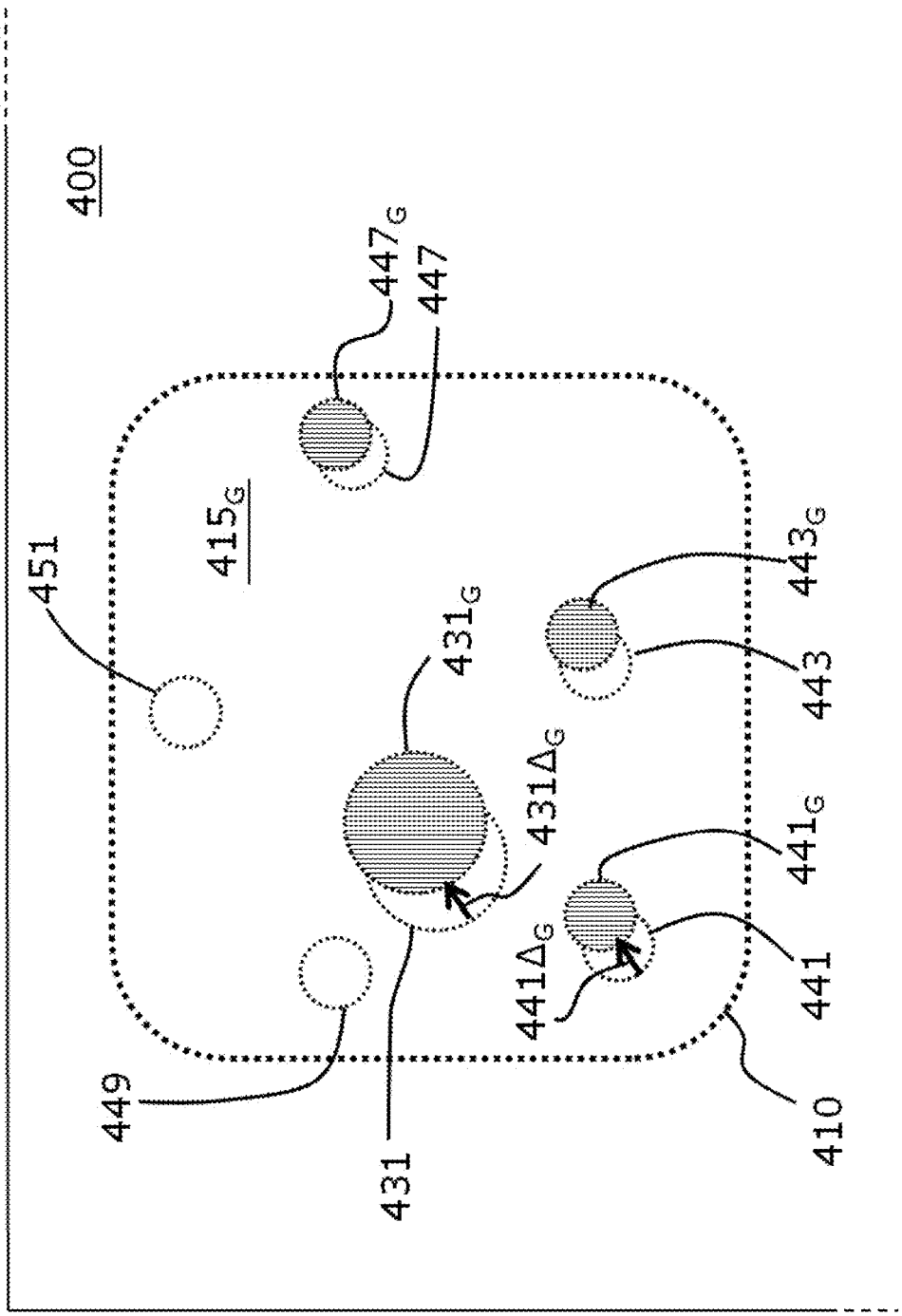
FIG. 4B is a depiction of a green fluorescence image of the substrate region depicted in FIG. 4A.

FIG. 4B depicts a green channel image $415_G$ of targets within a region 410 of a larger substrate 400. Images of targets lying outside region 410 are not shown. Green channel image $415_G$ was taken by selectively collecting light from the green fluorophores. The targets visible in green channel image $415_G$ are those that were labeled with green fluorophore, namely, subject targets/cells 441, 443, and 447, and facilitative target/microparticle 431. (In FIGS. 4B, 4D, and 4E green color is represented by vertical hatching). These targets produce green target images $441_G$, $443_G$, $447_G$, and $431_G$, respectively. Because of the chromatic aberration of green light, these green target images do not appear to be localized at the "actual" locations of the targets on the substrate (i.e., the locations determined under conditions wherein errors, including chromatic aberration, are minimal, nonexistent, or are posited to or defined to be zero), being generally shifted slightly up and to the right of the actual target locations. For example, green aberration vector $431\Delta_G$ represents the effect of the chromatic aberration of green light on the apparent position of microparticle 431, and green aberration vector $441\Delta_G$ represents the effect of chromatic aberration of green light on the apparent position of nearby cell 441. In general, the effects of chromatic aberration will vary across the surface of the substrate, such that the green chromatic aberration vector is a function of the x and y coordinates of the target. In region 410, however, all of the targets are sufficiently close together that the green chromatic aberration vectors of the targets are approximately equal.

Figure 4C:
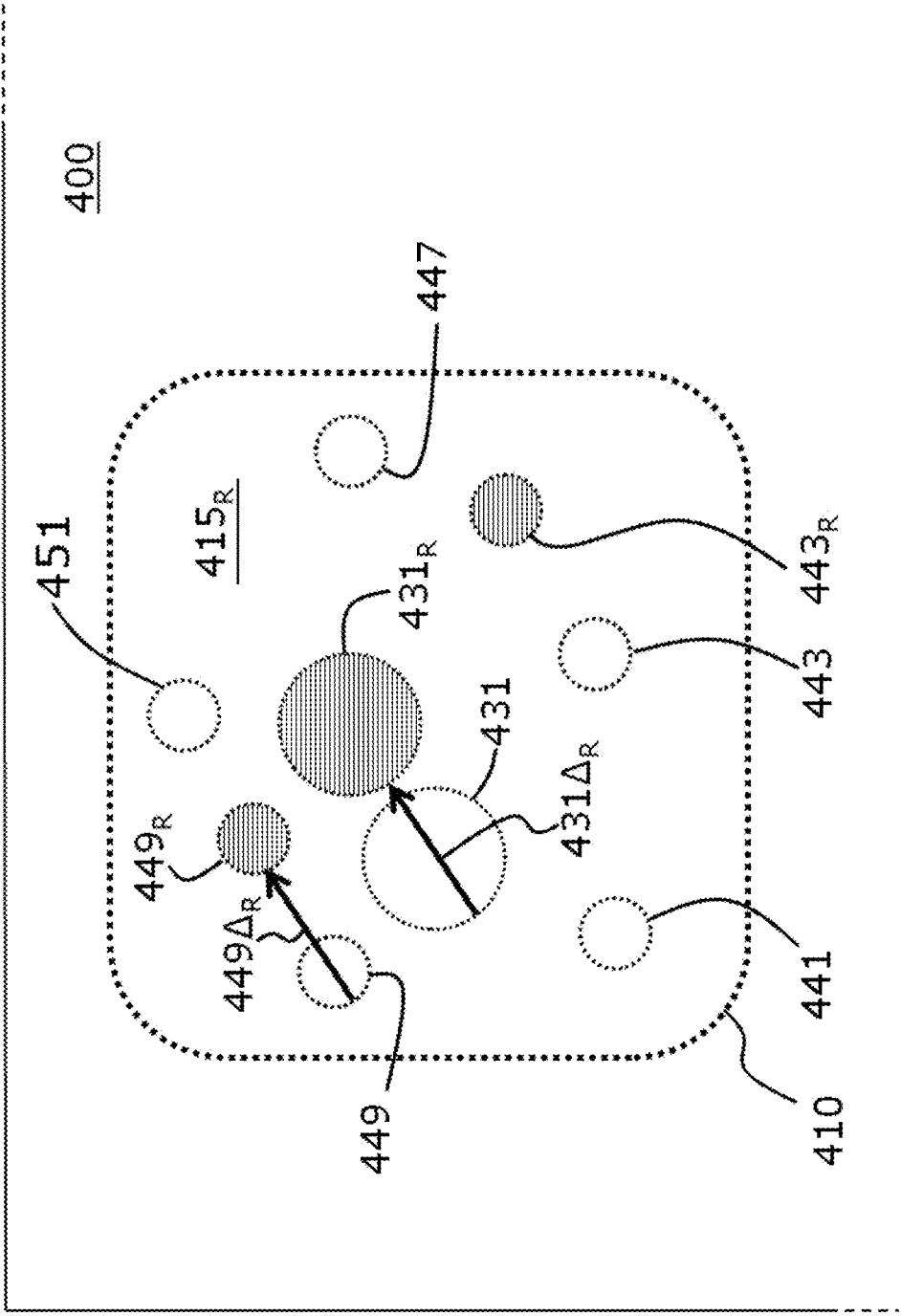
FIG. 4C is a depiction of a red fluorescence image of the substrate region of FIG. 4A.

FIG. 4C depicts a red channel image $415_R$ of targets within region 410. Images of targets lying outside region 410 are not shown. Red channel image $415_R$ was taken by selectively collecting light from the red fluorophores. The targets visible in red channel image $415_R$ are those that were labeled with red fluorophore, namely, subject targets/cells 443 and 449, and facilitative target/microparticle 431. (In FIGS. 4C, 4D, and 4E red color is represented by horizontal hatching). These targets produce red target images $443_R$, $449_R$, and $431_R$, respectively. Because of the chromatic aberration of red light, these red target images do not appear to be localized at the actual physical locations of the targets, being shifted generally up and to the right of the actual target locations. For example, red aberration vector $431\Delta_R$ represents the effect of chromatic aberration of red light on the apparent position of microparticle 431, and red aberration vector $449\Delta_R$ represents the effect of chromatic aberration of red light on the apparent position of nearby cell 449. In general, the effects of chromatic aberration will vary across the substrate, such that the red chromatic aberration vector be a function of the x and y coordinates of the object particle. In region 410, however, all of the particles are sufficiently close together that all of the red chromatic aberration vectors are approximately equal.

In generation, the chromatic aberration vectors will be not only position dependent, but also wavelength dependent. Thus, for example, red aberration vector $431\Delta_R$ is different from green aberration vector $431\Delta_G$. As depicted vector, vector $431\Delta_R$ has a greater magnitude than, but approximately the same direction as, vector $431\Delta_G$.

FIG. 4D depicts an overlay of green channel image $415_G$ (including green target images $441_G$, $443_G$, $447_G$, and $431_G$) and red channel image $415_R$ (including red target images $449_R$ and $431_R$), corresponding to region 410 of substrate 400. Images of targets lying outside region 410 are not shown. In addition, the actual positions of targets are not shown.

It can be desirable to extract a variety of information from FIG. 4D, such as the identities of cells labeled with green fluorophore, with red fluorophore, and with both green and red fluorophore (which will appear yellow). The wavelength dependence of the chromatic aberration vectors makes it difficult to extract this information, and other information, because the apparent positions of the targets (e.g., as suggested by their green or red images) do not coincide with each other or with the actual locations of those objects. For example, based on the apparent positions of the targets in FIG. 4D, there appear to be three cells that are labeled green, corresponding to images $441_G$, $443_G$ and $447_G$; two cells that are labeled red, based on red images $443_R$ and $449_R$, and no cells that are labeled both green and red, appearing yellow. However, chromatic aberration has not yet been corrected for in accordance with aspects of the present invention.

According to principles of the present invention, chromatic aberration can be quantified and corrected using information obtained from facilitative targets/microbeads. For example, with reference to FIG. 4D, facilitative target/microparticle 431 (e.g., a microbead) can be used as a sentinel of the relative chromatic aberration $431_{R-G}$ of red versus green light in region 410, which surrounds the microparticle 431. This relative chromatic aberration $431_{R-G}$ can be used to define a correction vector, e.g., the negative of vector $431_{R-G}$, that can then be applied to shift the locations of the red images $443_R$ and $449_R$ and correct for chromatic aberration of red (versus green) light.

Figure 4E:
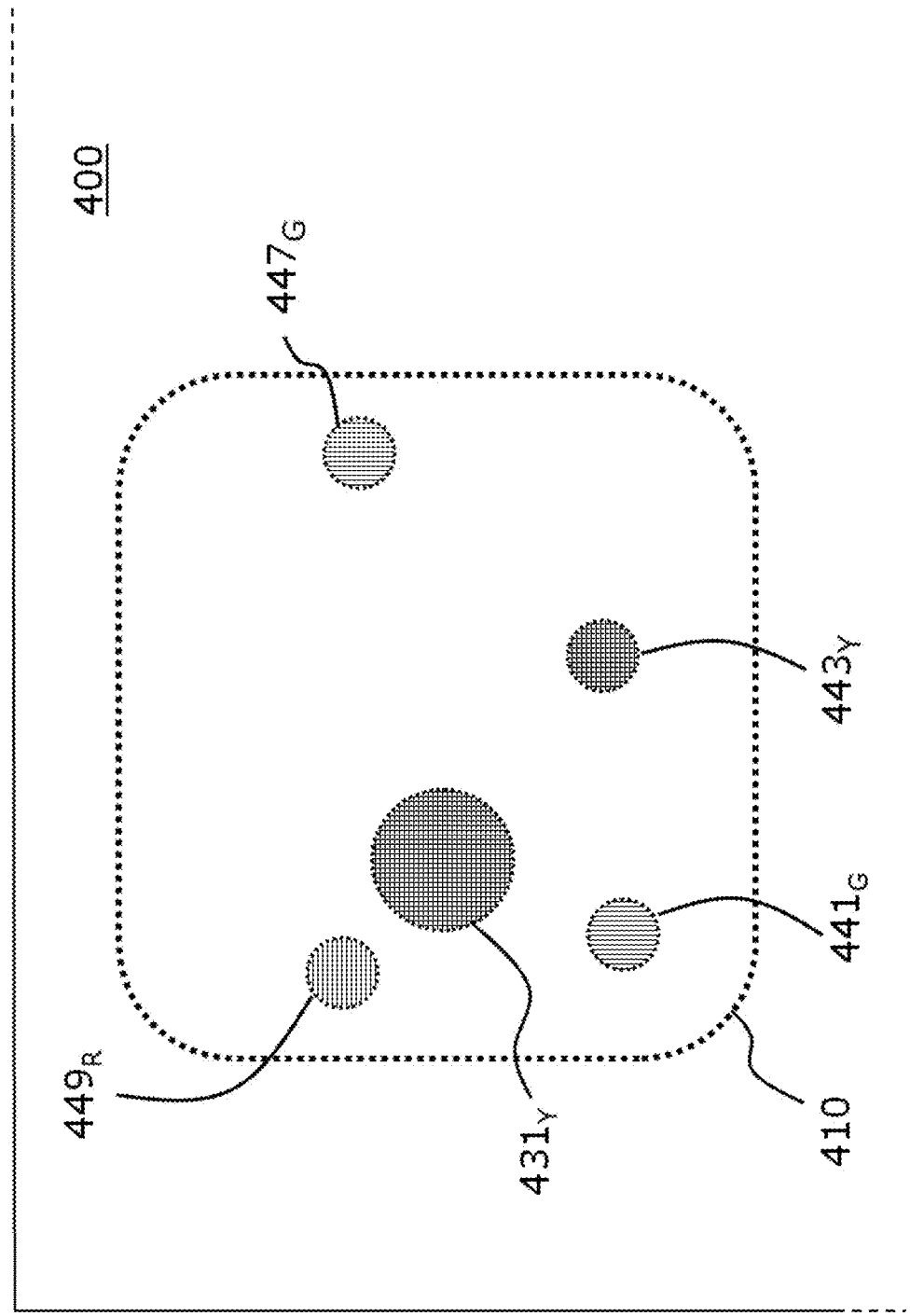
FIG. 4E is a superposition of the green fluorescence image of FIG. 4B and the red fluorescence image of FIG. 4C, following correcting for chromatic aberration according to principles of the present invention.

FIG. 4E shows the results of the relative chromatic aberration correction, according to principles of the present invention. As a result of this correction, the positions of the red and green images are co-localized, although these co-localized images are not necessarily coincident with the "actual" locations of the target (cell or microparticle) that emits light. Following correcting for chromatic aberration, yellow image $431_Y$ is visible, resulting from the superposition of the red object image $431_R$ and the green target image $431_G$ for microparticle 431, which is labeled with both red and green fluorophores. (Yellow color is represented by cross hatching.) Likewise, yellow image $443_Y$ is visible, resulting from the superposition of red target image $443_R$ and green object image $443_G$ for cell 443, which is labeled with both red and green fluorophores. Also visible are red target image $449_R$, resulting from cell 449 being labeled with red fluorophore, and green target images $441_G$ and $447_G$, resulting from cells 441 and 447, respectively, being labeled with green fluorophore.

Accordingly, it is clear, after correcting for chromatic aberration, that there are two cells that are labeled only green (not three, as it had appeared from the uncorrected image in FIG. 4D), one cell that is labeled only red (not two, as it had appeared from the uncorrected image in FIG. 4D), and one cell that is labeled both red and green (not zero, as it had appeared from the uncorrected image in FIG. 4D).

Microparticle 431 provides a convenient sentinel of relative chromatic aberration because it is visible across images acquired with multiple wavelengths and is easily distinguished (e.g. based on size) from subject targets. Further, microparticles can be deposited on the substrate such that they are sufficiently separated from each other that there is a clear correspondence of microparticle images to specific microparticles.

A wide variety of facilitative target/microparticle features can be exploited for use in chromatic aberration detection, quantification, and correction. For example, facilitative targets/microparticles can have a distinct intensity, size, or shape that can distinguish them from subject targets/cells. In some embodiments, the microparticles will produce an optical signal across multiple wavelengths, wavelength regions, or colors, such as, for example, in the red and green regions of the fluorescence labeling experiments described above. The ability of microparticles to be detected at multiple wavelengths can be achieved in a variety of ways. For example, they can be tagged, labeled, and/or embedded/doped with one or more fluorophores; or single-color microparticles can be linked together to make a supramolecular multicolored particle with defined fluorescence. Quantum dots can also be used, and/or fluorescent particles can be linked with other, potentially nonfluorescent particles.

In accordance with principles of the present invention, the facilitative targets/microparticles/beads serve as internal (inside the sample) calibration standards for chromatic aberration detection and correction. In sum, the chromatic aberration of the optical system will shift the facilitative targets/microparticles/bead's signal for different channel (colors of light). By choosing facilitative targets/microparticles/beads that are distinguishable from subject targets/cells, the resulting images can be analyzed to measure the pixel shift between the different colors of the facilitative targets/microparticles/beads, thereby quantifying at least relative chromatic aberration between those colors.

As chromatic aberrations are non-uniform in an image, the microparticles randomly dispersed throughout the image can be used to determine the proper transformation required for each subregion of an image. Such a transformation can require, for example, the alignment of meshes corresponding to the red and green images of some or all of the microparticles in a region of subregion. Triangulation and interpolation techniques can be used to refine the transformation function that will operate on subject targets/cells that lie in various regions of the mesh. Finally, it should be appreciated that this method can be applied to correct chromatic aberration within a multi-wavelength image wherein all colors are acquired simultaneously, rather than being acquired sequentially and then overlaid.

It should be appreciated that the foregoing methods and techniques can be used in connection with a wide variety of applications, including screening applications, high throughput applications, cellular astronomy, etc. For example, using these methods and techniques, an imaging apparatus can more readily focus on cells deposited on a substrate, detect/correct for chromatic aberration, and/or register multiple images, so as to increase the speed, sensitivity, throughput, and/or quality of cellular astronomy performed on the cells.

Example 1

Glass microbeads, approximately 10-30 microns in size, having a density of about 2.5 g/mL and a refractive index of about 1.5, were mixed into a solution containing fluorescently-stained and non-stained cells. The solution was deposited onto a surface and imaged by brightfield optical microscopy at low-magnification (about 1.3× magnification). Standard auto-focusing algorithms were unable to focus on the low-contrast cells under standard bright-field imaging conditions without the microparticles present. The addition of the microparticles into the solution enabled standard auto-focusing algorithms to achieve focus at the correct focal plane, namely the plane contained the cells. At the same time, these high-contrast microparticles were less prone to movement than low-density microparticles, which enabled them to act as registration markers (fiduciary points) to register multiple images together in bright-field imaging mode.

Additional Experiments

A series of imaging experiments was performed on mixtures of beads and cells, and the results are depicted in FIGS. 5A through 9B.

Fixed peripheral blood cells (CD3/CD4/CD8) were purchased from Streck (e.g., Streck CD-Chex Plus) and stained using a kit providing fluorescently-labeled antibodies against CD3/CD4 or CD3/CD8 plus dual-labeled fluorescent polystyrene beads (PE and PE-Cy5) for fluorescent gating (Beckton Dickinson FACSCount pre-mixed staining kit). Samples were prepared in phosphate buffered saline, and glass beads were also added to samples in some experiments.

Cell/bead solutions were deposited by spin-brushing onto glass slides on rotating substrates. After deposition, cells were allowed to settle for 15 minutes and then imaged at ~1-4× magnification with a custom microscope having a high numerical aperture (>=0.25) and large field of view (>0.65×0.65 cm). The epifluorescence microscope was configured with an excitation filter, a dichroic mirror, and two emission filters (PE and PE-Cy5). All optical elements were in infinitely corrected or nearly infinitely corrected spaces. The illumination source was a commercial high power LED with a broad spectral band.

FIGS. 5A and 5B demonstrate the use of facilitative targets to focus an imager prior to the acquisition of images for subject targets, in accordance with principles of the present invention. Specifically, FIG. 5A shows a series 510 of brightfield optical images of a mixture of beads and cells taken at short acquisition times (16 ms) to determine an optimal focal plane. Different focal planes (shown in FIG. 5A as Focal Planes 1 through 5) were selected by moving the sample in increments relative to the objective of the microscope. Beads 501 and 503 were determined to be in best focus at Focal Plane 3, as assessed using standard methods. See Vollath, D., The influence of the scene parameters and of noise on the behavior of automatic focusing algorithms, *J. Microsc.* 151, 133-146 (1988). Only beads, not cells, were visible at these short exposure times. Image 520 (FIG. 5B) was taken using the best focus setting for the facilitative targets (beads 501, 503) but at a longer exposure time (2 sec), rendering visible the smaller, fainter subject targets (cells, e.g., cell 521) along with beads 501 and 503.

FIG. 6 demonstrates the use of facilitative targets to correct for chromatic aberration in accordance with principles of the present invention. After focusing, fluorescence images were collected for subject targets (e.g., cell 601) and facilitative targets (e.g., bead 603) in both the red channel and the green channel. Panel A shows image 610, which resulted from overlaying the red and green channel images without correcting for chromatic aberration. To emphasize features of the image, approximate regions of color are indicated, with R, G, and Y labels corresponding to predominately red, green, and yellow regions, respectively.

Image 610 shows that an effect of chromatic aberration in that region is the separation of red and green colors in the x-y plane (plane of the substrate), and approximately along double-headed arrow 675, which schematically represents this color-separation effect. Panel B shows image 620, which resulted from overlaying red and green channel images after correcting for chromatic aberration using the facilitative targets (beads) as sentinels for chromatic aberration effects in the x-y plane. Following a transformation of red channel coordinates relative to green channel coordinates to correct for chromatic aberration, channel images were then overlaid to generate image 620. In image 620, the separation of red and green colors was greatly diminished, with the large center regions of both cell 601 and bead 603 appearing yellow, representing the superposition of red and green colors. While this experiment involved correcting for chromatic aberration with respect to two channels, principles of the present invention can be used to perform chromatic aberration corrections with respect to a number of channels (e.g., 2, 3, 4, 5, 6, 7, 8, 9, 10 or more such channels). It should be appreciated that the channels can be, for example, in a variety of spectral regions, including visible, infrared, and ultraviolet. In embodiments, the channels are wavelength bands, having a central wavelength and a bandwidth (e.g., a bandwidth of from about 10 to about 100 nm).

FIG. 7 demonstrates the use of facilitative targets according to aspects of the present invention to determine optimal focal parameters separately for each of two color channels, permitting correction for chromatic aberration in the z-axis (orthogonal to the substrate) prior to the overlay of fluorescence channel images. Specifically, image series 710 and 720 depict green channel and red channel, respectively, fluorescence images of a mixture of beads and cells. Different focal planes (shown as Focal Planes 1 through 5) were selected by moving the sample in increments relative to the objective of the microscope. For green channel and red channel, beads (e.g., bead 701) were determined to be in best focus at Focal Plane 3 and Focal Plane 2, respectively, as assessed using standard methods. At their respective optimal focal planes cells (e.g., cell 703) could be seen, appearing green and red, respectively in series 710 and 720. The optimal focal planes for each color channel were different due to the effects of chromatic aberration in the z-axis.

FIG. 8 shows fluorescence images of beads and cells, generated by overlaying red and green channel images acquired using different focal parameters from FIG. 7. Panel A depicts the result of overlaying images generated at the same focal plane for the red (R) and green (G) channel. $R_{FP2}+G_{FP2}$ (image 810) represents the overlay of the red channel image at Focal Plane 2 with the green channel image at Focal Plane 2; and $R_{FP3}+G_{FP3}$ (image 820) represents the overlay of the red channel image at Focal Plane 3 with the green channel image at Focal Plane 3. In image 810, the cells (including cell 703) appeared red, and in image 820, they appeared green. Panel B depicts the result of overlaying images generated at the optimal focal planes for each of the red (R) and green (G) channels, $R_{FP2}+G_{FP3}$. The cells (including cell 703) appear yellow, reflecting the method's utility in accounting for chromatic aberration effects in the z-axis.

Figure 9A:
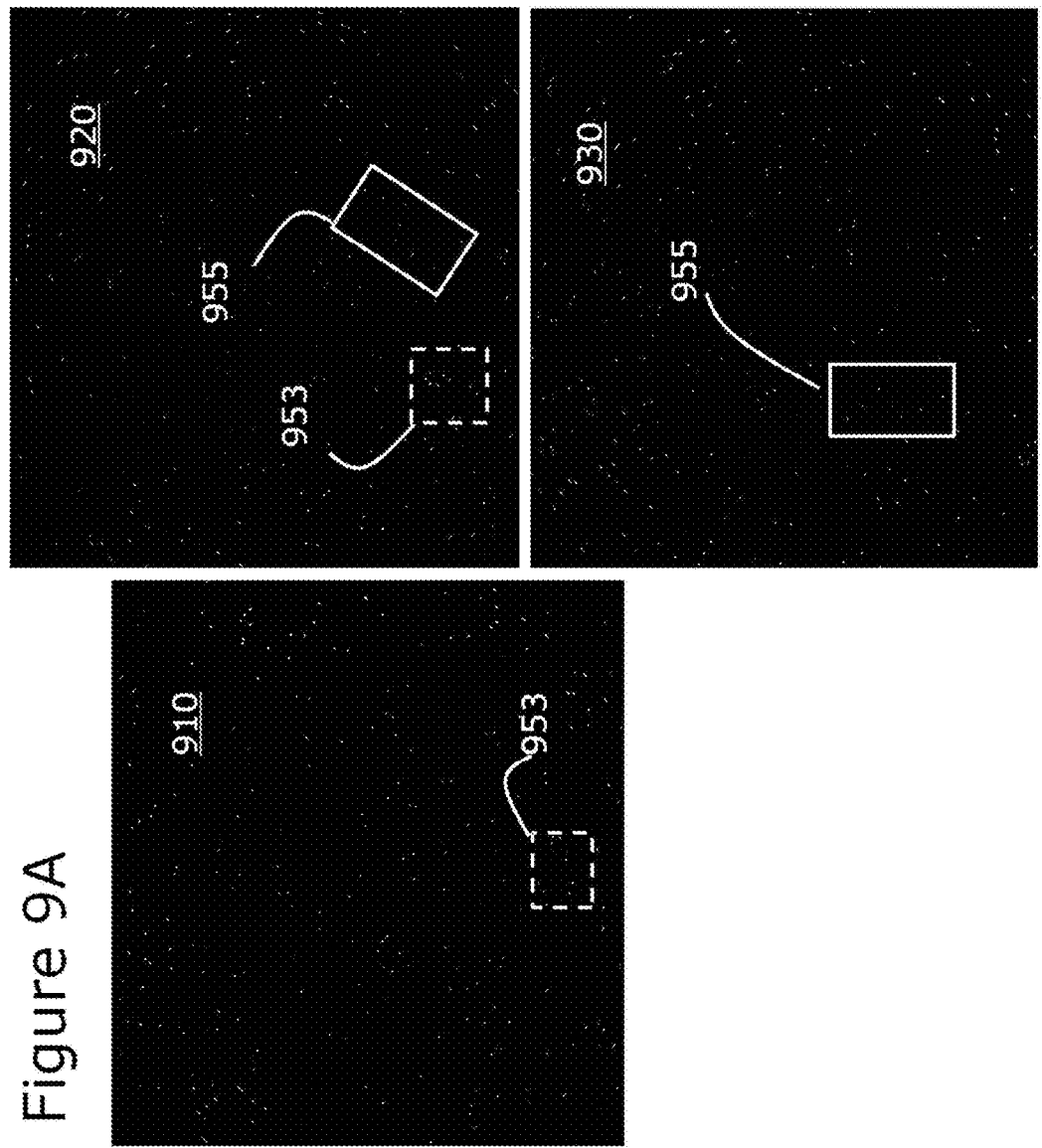
FIG. 9A is a series of brightfield optical micrographs of a mixture of beads and cells (only beads are visible) taken of three regions of a substrate.

FIG. 9A is a series of brightfield optical micrographs of a mixture of beads and cells (only beads are visible) taken in three regions of a substrate. Facilitative target (bead) information in area 953 was used as fiduciary markers to register regional images 910 and 920 with respect to one another. Facilitative target (bead) information in area 955 was used as fiduciary markers to register regional images 920 and 930 with respect to one another. FIG. 9B shows the result of registration of the three image regions to form image 980, representing a stitching together of images of 910, 920, and 930 using beads as soft-coded fiduciary markers according to principles of the present invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method for using an imager having an auto-focuser to acquire target information from subject targets on a planar substrate, comprising the steps of:
   forming a sample comprising a mixture of subject targets and facilitative targets that lie in a shared focal plane on a planar substrate, the facilitative targets being separate and distinct from the subject targets;
   in a first focusing step, using the auto-focuser, focusing the imager with respect to facilitative targets within a first region; and
   in a first imaging step, without refocusing the imager, using the imager to acquire information within the first region from at least subject targets;
   wherein during at least one of the first focusing step and the first imaging step the imager acquires first region facilitative target information,
   in a second focusing step, using the auto-focuser, focusing the imager with respect to facilitative targets within a second region;
   in a second imaging step, without refocusing the imager from the second focusing step, using the imager to acquire target information within the second region from at least subject targets,
   wherein during at least one of the second focusing step and the second imaging step the imager acquires second region facilitative target information; and
   registering the acquired target information from the subject targets within the first and second regions, using the first region facilitative target information and the second region facilitative target information.

2. The method of claim 1, further comprising:
   acquiring image data from at least one of the facilitative targets at each of a first wavelength band and a second wavelength band, the acquired information being chromatic aberration correction data;
   in at least one of the first and the second imaging steps, acquiring image data from the subject targets at each of the first wavelength band and the second wavelength band, the acquired image data being first wavelength and second wavelength subject target image data, respectively;
   using a processor coupled to the imager, correcting at least one of the first wavelength and second wavelength subject target image data for chromatic aberration based on the chromatic aberration correction data for the facilitative targets.

3. The method of claim 2, wherein the chromatic aberration correction data comprises apparent position data for the at least one facilitative target at each of the first and the second wavelength bands; and further wherein the correcting comprises:

generating a transformation function based on the difference in apparent position data for the at least one facilitative target at each of the first and the second wavelength bands; and applying the transformation function to at least one of the first wavelength and second wavelength subject target image data.

4. The method of claim 3, wherein the subject targets are cells and the facilitative targets are microparticles.

5. The method of claim 1, wherein the facilitative targets are non-biological.

6. The method of claim 1, wherein the facilitative targets are spheres.

7. The method of claim 1, wherein the facilitative targets are cubes.

8. The method of claim 1, wherein the facilitative targets have a higher contrast than the subject targets.

9. The method of claim 1, wherein the facilitative targets have an average major diameter of 0.2 to 10 times an average major diameter of the subject targets.

10. The method of claim 1, wherein the shared focal plane bisects the facilitative targets.

* * * * *